US008306655B2

(12) United States Patent
Newman

(10) Patent No.: US 8,306,655 B2
(45) Date of Patent: Nov. 6, 2012

(54) SYSTEMS AND METHODS FOR PROVIDING PORTION CONTROL PROGRAMMING IN A PRODUCT FORMING DISPENSER

(75) Inventor: David Roy Newman, Atlanta, GA (US)

(73) Assignee: The Coca-Cola Company, Atlanta, GA (US)

( * ) Notice: Subject to any disclaimer, the term of this patent is extended or adjusted under 35 U.S.C. 154(b) by 688 days.

(21) Appl. No.: 12/204,392

(22) Filed: Sep. 4, 2008

(65) Prior Publication Data

US 2009/0069947 A1 Mar. 12, 2009

Related U.S. Application Data

(60) Provisional application No. 60/970,488, filed on Sep. 6, 2007.

(51) Int. Cl.
*G06F 17/00* (2006.01)

(52) U.S. Cl. ........ 700/233; 700/231; 700/236; 700/239; 700/240

(58) Field of Classification Search .................. 700/231, 700/233, 236, 239, 240
See application file for complete search history.

(56) References Cited

U.S. PATENT DOCUMENTS 4,563,739 A 1/1986 Gerpheide et al.
4,819,176 A 4/1989 Ahmed et al.
4,962,866 A * 10/1990 Phillips ......................... 700/232
5,147,068 A 9/1992 Wright
5,225,819 A 7/1993 Hosotani et al.
5,312,017 A 5/1994 Schroeder et al.
5,358,145 A 10/1994 Smith et al.
5,603,430 A 2/1997 Loehrke et al.
5,615,801 A 4/1997 Schroeder et al.
5,691,684 A 11/1997 Murrah
5,735,436 A 4/1998 Schroeder et al.
5,798,694 A 8/1998 Reber et al.
5,842,603 A 12/1998 Schroeder et al.
6,119,434 A 9/2000 Andersson
6,131,399 A 10/2000 Hall
6,238,721 B1 5/2001 Knepler
6,354,468 B1 3/2002 Riek
(Continued)

FOREIGN PATENT DOCUMENTS

DE 196 27 360 A1 1/1998
(Continued)

OTHER PUBLICATIONS

International Search Report of PCT/US2008/075175 dated Aug. 24, 2010.

(Continued)

*Primary Examiner* — Timothy Waggoner
(74) *Attorney, Agent, or Firm* — Sutherland Asbill & Brennan LLP

(57) ABSTRACT

Disclosed are systems and methods for configuring portion control for a dispenser apparatus. A plurality of beverage ingredients may be associated with the dispenser apparatus, and a plurality of selectable beverages may be formed from the plurality of beverage ingredients. Input for one or more preferences associated with portion control may be received. Stored information associated with at least one of the plurality of selectable beverages may be accessed. At least one portion control for at least one of the plurality of selectable beverages may be determined based at least in part on at least a portion of the received input and at least a portion of the accessed information.

25 Claims, 11 Drawing Sheets

U.S. PATENT DOCUMENTS

| | | | |
|---|---|---|---|
| 6,375,043 | B1 | 4/2002 | LeBlanc |
| 6,378,275 | B1 | 4/2002 | Andersson |
| 6,424,884 | B1 | 7/2002 | Brooke et al. |
| 6,465,035 | B1 | 10/2002 | Knepler |
| 6,479,086 | B1 | 11/2002 | Knepler |
| 6,564,999 | B1 | 5/2003 | Saveliev et al. |
| 6,572,016 | B2 | 6/2003 | Saveliev et al. |
| 6,698,228 | B2 | 3/2004 | Kateman et al. |
| 6,751,525 | B1 | 6/2004 | Crisp |
| 6,756,069 | B2 | 6/2004 | Scoville et al. |
| 6,772,944 | B2 | 8/2004 | Brown |
| 6,799,085 | B1 | 9/2004 | Crisp |
| 6,807,460 | B2 | 10/2004 | Black et al. |
| 6,907,741 | B2 | 6/2005 | Kateman |
| 6,918,258 | B2 | 7/2005 | Cunha et al. |
| 6,941,858 | B2 | 9/2005 | Kateman |
| 6,968,876 | B2 | 11/2005 | Yacko et al. |
| 6,980,887 | B2 | 12/2005 | Varga et al. |
| 6,982,640 | B2 | 1/2006 | Lindsay et al. |
| 6,990,391 | B1 | 1/2006 | Cunha et al. |
| 7,009,519 | B2 | 3/2006 | Leonard et al. |
| 7,020,680 | B2 | 3/2006 | Defosse |
| 7,028,861 | B2 | 4/2006 | Sayers et al. |
| 7,031,804 | B2 | 4/2006 | Brooke et al. |
| 7,032,818 | B2 | 4/2006 | Thomas |
| 7,053,773 | B2 | 5/2006 | McGarry et al. |
| 7,082,970 | B2 | 8/2006 | Bartholomew et al. |
| 7,147,131 | B2 | 12/2006 | Sher et al. |
| 7,156,259 | B2 | 1/2007 | Bethuy et al. |
| 7,223,427 | B2 | 5/2007 | Knepler |
| 7,331,483 | B2 * | 2/2008 | Bhimani et al. .................. 222/1 |
| 7,387,239 | B2 | 6/2008 | Thomas et al. |
| 7,391,318 | B2 | 6/2008 | Higashi |
| 7,640,755 | B1 | 1/2010 | Kateman |
| 2002/0059175 | A1 | 5/2002 | Nakano |
| 2002/0161653 | A1 | 10/2002 | Walker et al. |
| 2002/0183893 | A1 | 12/2002 | Brooke et al. |
| 2003/0010791 | A1 | 1/2003 | Gentiluomo et al. |
| 2003/0129286 | A1 | 7/2003 | Knepler |
| 2004/0103033 | A1 | 5/2004 | Reade et al. |
| 2004/0113786 | A1 | 6/2004 | Maloney |
| 2004/0129720 | A1 | 7/2004 | Cheng et al. |
| 2004/0226994 | A1 | 11/2004 | Brown |
| 2004/0243259 | A1 | 12/2004 | Peterson et al. |
| 2005/0075900 | A1 | 4/2005 | Arguimbau |
| 2005/0143857 | A1 | 6/2005 | Chirnomas |
| 2005/0167493 | A1 | 8/2005 | Barton et al. |
| 2005/0178793 | A1 | 8/2005 | Cheng et al. |
| 2005/0258961 | A1 | 11/2005 | Kimball et al. |
| 2005/0276883 | A1 | 12/2005 | Jeffrey et al. |
| 2006/0000851 | A1 | 1/2006 | Girard et al. |
| 2006/0043101 | A1 | 3/2006 | Bhimani et al. |
| 2006/0051614 | A1 | 3/2006 | Su et al. |
| 2006/0054614 | A1 | 3/2006 | Baxter et al. |
| 2006/0081653 | A1 | 4/2006 | Boland et al. |
| 2006/0102645 | A1 | 5/2006 | Walker et al. |
| 2006/0108415 | A1 | 5/2006 | Thomas et al. |
| 2006/0115570 | A1 | 6/2006 | Guerrero et al. |
| 2006/0115572 | A1 | 6/2006 | Guerrero et al. |
| 2006/0131329 | A1 | 6/2006 | Sayers et al. |
| 2006/0144244 | A1 | 7/2006 | Girard et al. |
| 2006/0192003 | A1 | 8/2006 | Chung |
| 2006/0261156 | A1 | 11/2006 | Brown |
| 2007/0016852 | A1 | 1/2007 | Kim et al. |
| 2007/0044820 | A1 | 3/2007 | Chan et al. |
| 2007/0252709 | A1 | 11/2007 | Collins et al. |
| 2008/0029541 | A1 | 2/2008 | Wallace et al. |
| 2008/0116262 | A1 | 5/2008 | Majer |
| 2008/0173705 | A1 | 7/2008 | Girard et al. |

FOREIGN PATENT DOCUMENTS

| | | | |
|---|---|---|---|
| EP | 1626375 | A1 | 2/2006 |
| GB | 2416757 | A | 9/2004 |
| WO | 2007056407 | A2 | 5/2007 |
| WO | 2007070032 | A1 | 6/2007 |

OTHER PUBLICATIONS

Disclosure Under 37 C.F.R. §1.56 as filed Dec. 22, 2008.

* cited by examiner

SYSTEMS AND METHODS FOR PROVIDING PORTION CONTROL PROGRAMMING IN A PRODUCT FORMING DISPENSER

RELATED APPLICATION

This application claims priority to U.S. Provisional Ser. No. 60/970,488, entitled "Systems and Methods for Providing Portion Control Programming in a Beverage Forming Dispenser." filed on Sep. 6, 2007, the contents of which are incorporated by reference.

TRADEMARKS

COCA-COLA® is a registered trademark of The Coca-Cola Company, Atlanta, Ga., U.S.A. Other names, symbols, designs, or logos used herein may be registered trademarks, trademarks or product names of The Coca-Cola Company or other companies.

TECHNICAL FIELD OF THE INVENTION

This invention relates to product dispensers, and in particular, relates to systems and methods for providing portion control programming in a product forming dispenser.

BACKGROUND OF THE INVENTION

Conventional beverage dispensers can pour a beverage by combining a syrup, sweetener, and/or water. These conventional beverage dispensers generally offer a finite variety of beverage selections that incorporate different kinds of syrups. The offered beverage selections can include branded and non-branded beverage selections. As an example, a single conventional dispenser using several different kinds of syrup might be able to offer choices of COCA-COLA™, DIET COCA-COLA™, SPRITE™, and a few other branded or non-branded beverage selections.

Prior to operating a beverage dispenser at a location, such as in a restaurant or at a gas station, the beverage dispenser is typically configured or calibrated. The calibration can be utilized to set the types of beverages that are to be dispensed by the beverage dispenser and parameters associated with the dispense of each beverage. In some conventional beverage dispensers, a portion control dispense can be configured or calibrated for each beverage. Typically, a conventional portion control dispense actuates one or more solenoids, switches and/or valves associated with a selected beverage for a predetermined period of time, thereby causing a predetermined amount of syrup, sweetener, and/or water to be dispensed for the selected beverage.

For conventional beverage dispensers, a portion control dispense is often calibrated for each beverage selection. Additionally, for each beverage selection, the portion control dispense is often calibrated individually for a plurality of respective cup sizes that may be dispensed by the conventional beverage dispensers. In order to calibrate portion control dispenses for each beverage selection, a programming mode for the beverage dispenser is typically entered into. Then, the dispense of a particular beverage selection can be manually controlled for a particular cup size, and the time for the dispense can be determined and stored for future portion control dispenses. This process can then be repeated for the remaining cup sizes for the beverage. Additionally, it is often desirable to double check the settings for the beverage to ensure that the programmed portion control dispenses are correct.

One problem with the calibration of portion control dispenses for conventional beverage dispensers is that each beverage selection is calibrated individually. Additionally, each cup size offered for a particular beverage selection is calibrated individually. The individual calibration and programming of conventional beverage dispensers can be referred to as empirical calibration or empirical programming due to the manual operations involved. These conventional calibrations techniques are often very time consuming. The time needed to calibrate the beverage dispenser further increases as the number of beverage selections for the beverage dispenser increases. Additionally, these conventional calibration techniques waste a large amount of syrup and other beverage components as at least one dispense is typically performed to calibrate each cup size for each beverage selection.

Accordingly, there is a need for improved systems and methods for providing portion control programming for a beverage dispenser.

SUMMARY OF THE INVENTION

Some or all of the above needs and/or problems may be addressed by embodiments of the invention. Embodiments of the invention may include systems and methods for configuring portion control for a dispenser apparatus. In one embodiment, a method for configuring portion control for a dispenser apparatus is provided. A plurality of product ingredients may be associated with the dispenser apparatus, and the dispenser apparatus may be capable of forming a plurality of selectable products from the plurality of product ingredients. Input for one or more preferences associated with portion control may be received. Stored information associated with at least one of the plurality of selectable products may be accessed. At least one portion control for at least one of the plurality of selectable products may be determined based at least in part on at least a portion of the received input and at least a portion of the accessed information.

In another embodiment, a method for dispensing a portion control amount of a selected product may be provided. A plurality of product ingredients may be associated with a dispenser apparatus, and the dispenser apparatus may be capable of forming a plurality of selectable products from the plurality of product ingredients. Input of one or more preferences associated with portion controls may be received. A command to dispense the selected product may be received. Stored information associated with the selected product may be accessed. An amount of the selected product to dispense may be determined based at least in part on at least a portion of the one or more preferences and at least a portion of the accessed information. The determined amount of the selected product may be dispensed in response to the received command.

In yet another embodiment, a dispenser apparatus may be provided. The dispenser apparatus may include an ingredient matrix operable to receive a plurality of product ingredient packages within respective locations, wherein a plurality of selectable products may be formed from the plurality of product ingredients. The dispenser apparatus may further include a memory device operable to store information associated with at least one of the plurality of selectable products and an input device operable to receive one or more preferences associated with portion controls. The dispenser apparatus may further include a controller operable to execute a set of instructions operable to receive the one or more preferences from the input device, access at least a portion of the stored information, and determine at least one portion control for the at least one of the plurality of selectable products based at least in part on a portion of the preferences and at least a portion of the accessed information.

Additional systems, methods, dispensers, features and advantages are realized through the techniques of various embodiments of the invention. Other embodiments and aspects of the invention are described in detail herein and are considered a part of the claimed invention. Other advantages and features can be understood with reference to the description and to the drawings.

BRIEF DESCRIPTION OF THE FIGURES

Reference will now be made to the accompanying drawings, which are not necessarily drawn to scale, and wherein.

The detailed description explains various embodiments of the invention, together with advantages and features, by way of example with reference to the drawings.

DETAILED DESCRIPTION OF EMBODIMENTS OF THE INVENTION

As used herein, the terms “beverage forming dispenser”, “product dispenser”, “beverage dispenser”, “dispenser apparatus”, and “dispenser” refer to a device which dispenses a product such as a beverage, can, bottle, or container.

As used herein, the terms “product” and “beverage”, and their pluralized forms, are used synonymously, and embodiments of the invention should not be limited in scope by the use of either term.

Illustrative embodiments of the invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Figure 1:
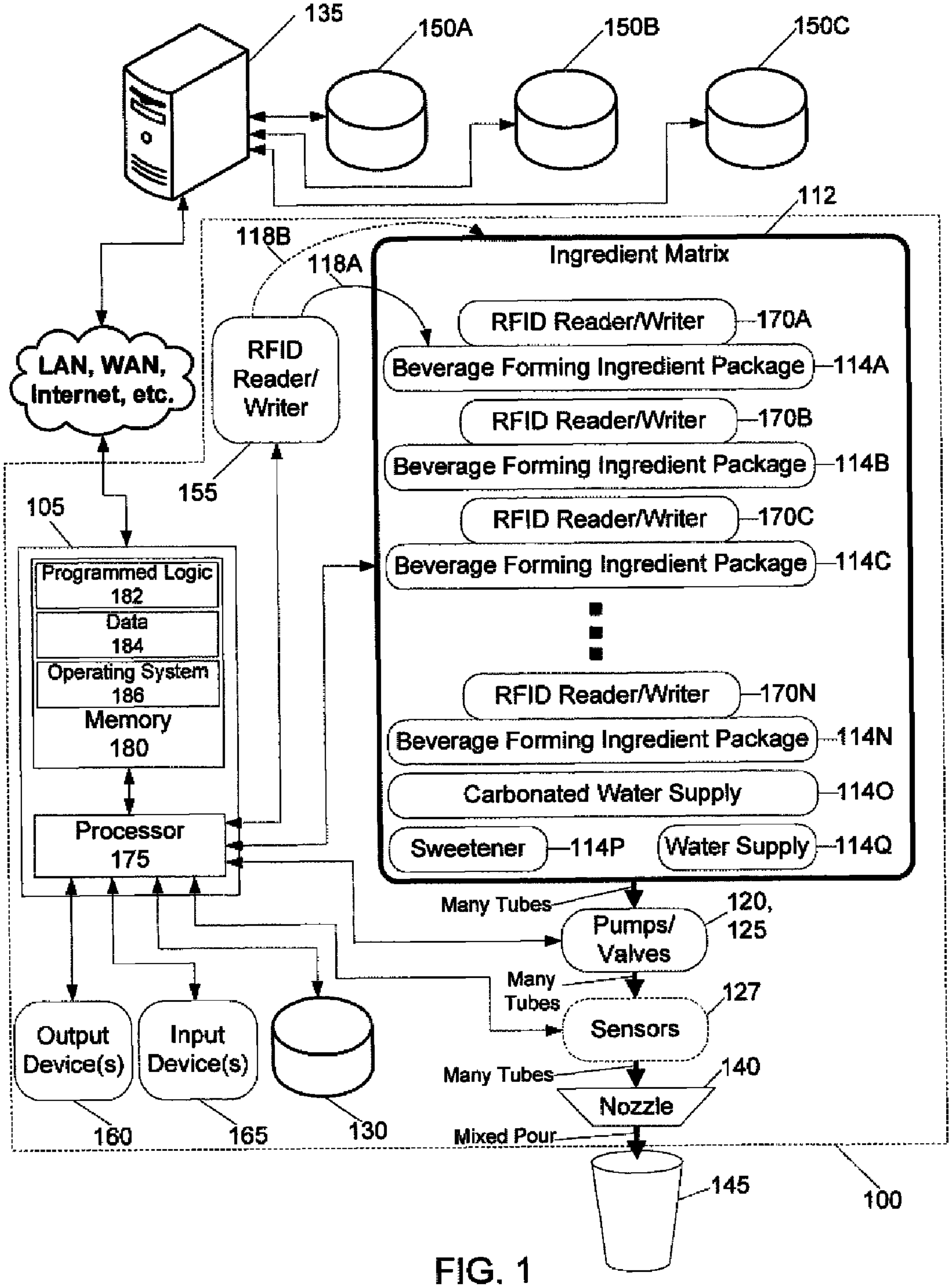
FIG. 1 illustrates one example of a beverage forming dispenser in accordance with an embodiment of the invention.

Turning now to the drawings in greater detail, it will be seen that in FIG. 1 there is one example of a beverage forming dispenser 100 that may be utilized in accordance with embodiments of the invention. The example beverage forming dispenser 100 may include a controller 105 operationally related to an ingredient matrix 112. A plurality of beverage forming ingredient sources may be connected to the ingredient matrix 112. Suitable beverage forming ingredient sources may include, for example, beverage forming ingredient packages that are inserted into the ingredient matrix 112 and/or beverage forming ingredient sources that are remotely situated relative to the beverage forming dispenser 100 and connected to the ingredient matrix 112 via suitable supply lines. For example, beverage forming ingredient sources may be supplied to the beverage forming dispenser 100 via a bag-in-box (BIB) system.

In one embodiment, a plurality of beverage forming ingredient packages may be inserted into the ingredient matrix 112. The ingredient matrix may secure each of the plurality of beverage forming ingredient packages, such as 114A-114Q. In addition, the ingredient matrix 112 may be operationally related to a controller, such as controller 105, and to a plurality of pumps 120 and/or valves 125. In this regard, under control of the controller 105, the plurality of pumps 120 and/or valves 125 may be operated to effectuate the precise pumping of beverage forming products from certain of the plurality of beverage forming ingredient packages 114A-114Q to dispense a custom beverage. A plurality of sensors 127 may optionally monitor and measure the amount of beverage forming products that are pumped from certain of the plurality of beverage forming ingredient packages 114A-114Q.

In one embodiment, the ingredient matrix 112 may have dozens of different types and kinds of beverage forming ingredient packages, such as 114A-114Q, inserted into it. In operation, each of the beverage forming ingredient packages 114A-114Q may be selectively combined per a recipe in varying ratios to form thousands of different kinds of beverages.

For example and not as a limitation, a customer, consumer, or user may make a beverage type selection at a suitable input device 165 associated with the controller, such as a user interface. A recipe to form the selected beverage including ingredients and ratio of ingredients may be obtained by the controller 105 from a database local to the controller 105, such as database 130, from memory associated with the controller 105, such as memory 180, and/or from a remote data processing resource, such as data processing resource 135 which may be a server. The controller 105 may operate any certain of the plurality of pumps 120 and/or valves 125 to form and dispense a beverage by way of a nozzle 140 into a cup 145.

Beverage forming dispensers in accordance with embodiments of the invention, such as beverage forming dispenser 100, may store or be associated with any number of ingredients, for example, lime flavoring, vanilla flavoring, cherry flavoring, and various ingredient parts of many branded and non-branded drinks. An advantage is that, for example and not as a limitation, a COCA-COLA™ beverage can be poured, or by adding cherry flavoring a CHERRY COCA-COLA™ beverage can be poured, or by adding vanilla flavoring and changing the formula a DIET VANILLA COCA-COLA™ beverage can be poured. In one embodiment, by having a controller 105 operationally related to a plurality of beverage forming ingredient packages 114 and a plurality of pumps 120 and valves 125, a consumer can form and pour thousands of different kinds of beverages by adding flavoring, and/or combining and varying ingredients and ingredient ratios.

With continued reference to FIG. 1, according to some embodiments of the invention, the controller 105 may be operationally related to a database 130 that includes beverage recipes, formulations, and methods of making beverages. Such beverage recipes, formulations, and methods of making beverages may include an ingredient list, the ratio of each ingredient, a listing of how a beverage can be customized by a consumer, consumer preferences for dispensing one or more beverages, portion control dispense information associated with one or more beverages and/or other types and kinds of beverage recipes, formulations, and methods of making a beverage as may be required and/or desired by a particular embodiment. The controller 105 may be operable to execute a set of instructions to form one or more beverages from one or more of the beverage forming ingredient packages for dispensing to a consumer. Also illustrated in FIG. 1 is a nozzle 145. The nozzle 145 may combine the flows from the plurality of pumps 120 and/or valves 125 to mix and dispense the beverage into a cup, such as cup 145. The mixing of the beverage may occur prior to, during, and/or following the dispense of the flows from the nozzle 145.

With regards to the ingredient matrix 112, there is illustrated in FIG. 1 how a plurality of beverage forming ingredient packages, such as 114A-114Q, may be physically inserted into respective locations within the ingredient matrix 112, secured, and associated with a unique pump, valve, and/or a unique combination of pump(s) and/or valve(s). Then in operation, by way of pumps 120 and valves 125, as required by a recipe, select beverage forming ingredient packages, such as 114A-114Q, can be pumped in precise amounts or ratios to form branded beverages such as CHERRY COCA-COLA™, VANILLA COCA-COLA™, COCA-COLA™, DIET COCA-COLA™, and FANTA™, as well as a vast range of other branded beverages, non-branded beverages, and/or consumer customized beverages. A beverage forming dispenser in accordance with embodiments of the invention, such as beverage forming dispenser 100, may dispense a vast range of beverage types, including but not limited to, carbonated beverages, non-carbonated beverages, diet beverages, teas, coffees, vitamin beverages, energy drinks, sports drinks, and/or dairy products.

For purposes of disclosure, beverage forming packages, such as 114A-114Q, may be collectively or generally referred to as beverage forming ingredient package 114. Each beverage forming ingredient package 114 may be manufactured as a pouch of liquid secured in a plastic ridged container to allow insertion into the ingredient matrix 112. When inserted into the ingredient matrix 112, the pouch may be pierced by at least one fitting or other suitable piercing device, allowing the liquid in the pouch to be pumped or otherwise metered by pumps 120 and/or valves 125 in precise ratios to form the desired beverage. Additionally, one or more sensors, such as sensors 127, may monitor the amount or volume of liquid that is pumped from a beverage forming ingredient package 114. One or more sensors 127 may also be utilized to aid in the detection of a beverage forming ingredient package 114 that is approximately empty and/or not flowing properly. For example, a capacitive sensor may be situated between a beverage forming ingredient package 114 and an associated pump 120. The capacitive sensor may detect each time that liquid is drawn into the pump 120. As an example, the capacitive sensor may detect the flexing of a metal strip each time that liquid is drawn into the pump 120. If no flex is detected by the capacitive sensor, then a determination may be made by a controller in communication with the capacitive sensor, such as controller 105 or node controller 310A shown in FIG. 3, that the beverage forming ingredient package 114 is approximately empty and/or malfunctioning. If a flex is detected, then a determination may be made by a controller in communication with the capacitive sensor that the beverage forming ingredient package 114 is functioning properly and contains a sufficient amount of liquid to complete the pumping and dispense of a beverage.

In some instances, other ingredients, components, or beverage forming additives may be inserted or otherwise operatively connected with the ingredient matrix 112. For instance, a carbonated water supply 114O, a sweetener 114P, and a water supply 114Q may be operatively connected with the ingredient matrix 112. These ingredients, components, or beverage forming additives may be in the form of a pouch, or may be in another configuration suitable for access by the ingredient matrix 112. For example, one or more of these ingredients, components, or beverage forming additives may be supplied to the ingredient matrix 112 via suitable input tubing from respective beverage forming ingredient sources.

In the examples of the carbonated water supply 114O and the water supply 114Q, a continuous supply of liquid like carbonated water, water and/or other continuous ingredient supplies can be provided by a combination of pumps 120, valves 125, and/or variable orifice regulators to meter and/or control the flow of liquid, carbonated water, water, or other ingredient supplies during the formation of the beverage. In a continuous supply example, the carbonated water supply 114O and the water supply 114Q may be connected to the ingredient matrix 112. Additionally, in accordance with some embodiments of the invention, one or more beverage forming ingredients may be circulated through a prechiller (not shown) before being supplied to the ingredient matrix 112. For example, carbonated water and water may be respectively supplied from the carbonated water supply 114O and the water supply 114Q and circulated through one or more prechillers prior to being supplied to the ingredient matrix 112. Additionally or alternatively, one or more beverage forming ingredients may be supplied from refrigerated sources.

In one example, sweetener 114P may be a non-nutritive sweetener (NNS), high fructose corn syrup (HFCS), or other types or kinds of sweetener as may be required and/or desired in a particular embodiment. In this example, the sweetener 114P can be a pouch capable of being connected to the ingredient matrix 112. Additionally, in some embodiments, a plurality of sweeteners may be supplied to the ingredient matrix 112.

In one embodiment, some of the beverage forming ingredients 114 referred to as pungent may be limited to selected ingredient matrix 112 locations. In this regard, pungent ingredients are so strong that once a pungent ingredient is drawn through dispenser tubing in the beverage forming dispenser the tubing is permanently flavored and any fluids that pass through the tubing will be tainted with the pungent taste. As such, once a pungent ingredient is used in the matrix, it may be desirable to limit the replacement and/or addition of other pungent ingredients to certain of the ingredient matrix locations to maintain a premium quality beverage.

Also in one embodiment, certain of the beverage forming ingredient packages 114 may require agitation to keep the ingredient mixed. In these cases, the location of such ingredients in the ingredient matrix may be limited to ingredient matrix locations that can be agitated as may be required and/or desired in a particular embodiment.

Additionally, one or more continuous ingredient supplies may be connected to the ingredient matrix 112 in respective locations in which the continuous ingredient supplies may be agitated. For example, a continuous supply of ice may be connected to the ingredient matrix 112, and ice may be agitated prior to, during, and/or after the dispense of a beverage.

Also in one embodiment, certain of the beverage forming ingredient packages 114 may require antimicrobial tubing and/or dispenser parts. These beverage forming ingredient packages 114 may include milk, dairy, soy, and/or other types and kinds of beverage forming ingredient packages. In these cases, the location of such ingredients in the ingredient matrix 112 may be limited to ingredient matrix locations that utilize the appropriate antimicrobial tubing and/or dispenser parts as may be required and/or desired in a particular embodiment.

In one embodiment, for the most part, there may be a relationship between a particular beverage forming ingredient package 114 and one or more respective pumps 120 and/or valves 125. For example, there may be a one-to-one relationship between a particular beverage forming ingredient package 114 and a pump 120 and/or valve 125. As another example, there may be a four-to-one relationship between a particular beverage forming ingredient package 114 and associated pumps 120 and/or valves 125. A wide variety of relationships between a particular beverage forming ingredient package 114 and associated pump(s) and/or valve(s) may be utilized as desired in various embodiments of the invention. The utilization of more than one pump 120 and/or valve 125 may facilitate the ability to draw a higher volume of a beverage ingredient from a beverage forming ingredient package 114 in a shorter period of time. In a few cases, it may be desirable to utilize a plurality of pumps and/or valves on a single ingredient to be able to draw a higher volume of liquid from the package in a shorter period of time. One such ingredient in which it may be desirable to use a plurality of pumps 120 and/or valves 125 to be able to draw a higher volume of liquid from the package 114 in a shorter period of time can be the sweetener 114P.

With continued reference to FIG. 1, a controller associated with a beverage forming dispenser 100, such as controller 105, may be any suitable controller, computing device, or plurality of devices, for example, a microcontroller, minicomputer, personal computer, etc. The controller 105 may include a processor 175 and a memory 180. The memory 180 may store programmed logic 182 (e.g., software) in accordance with embodiments of the invention. One example of software or a computer-readable medium may be program code or a set of instructions operable to control the operation of a beverage forming dispenser, such as beverage forming dispenser 100. In certain embodiments of the invention, the memory 180 may also include data 184 utilized in the operation of the beverage forming dispenser 100. The data 184 may include data that is manually input into the controller 105, data that is communicated to the controller 105, data associated with and/or received from other components of the beverage forming dispenser 100, data received from customers or users of the beverage forming dispenser 100, and/or data received from a remote source, such as data processing resource 135. In certain embodiments of the invention, the memory 180 may also include an operating system 186. The processor 175 may utilize the operating system 186 to execute the programmed logic 182, and in doing so, may also utilize at least a portion of the data 184.

The controller 105 may receive input or data from other components of the beverage forming dispenser 100, from remote devices, such as data processing resource 135, and/or from a customer or user via one or more suitable input devices 165. The one or more suitable input devices may include touch pads, touch screens, interactive displays, selection elements, switches, buttons, keyboards, keypads, control panels, disk drives, CD-ROMS, DVDs, removable memory devices, and/or any other device capable of communicating data to the controller 105. The controller 105 may also output data or control the output of data to other components of the beverage forming dispenser 100, to one or more remote devices, and/or to one or more suitable output devices 160. The one or more suitable output devices may include displays, interactive displays, printers, etc.

With continued reference to FIG. 1, a controller associated with a beverage forming dispenser 100, such as controller 105, may be related to or connected to one or more servers or data processing resources, such as data processing resource 135, via a suitable network connection. In one embodiment, a beverage forming dispenser 100 may be networked via a network connection to the data processing resource 135, such as a server. Such a network connection may be facilitated by any appropriate network, for example, the Internet, a local area network (LAN), a wide area network (WAN), a LON WORKS network, and/or other types and kinds of networks or network connections as may be required and/or desired by a particular embodiment.

The data processing resource 135, such as a server, may be in communication with a plurality of databases such as recipes, formulations, and methods of making beverages database 150A, operational database 150B, and/or consumer database 150C. In addition, the data processing resource 135 may be used to aid or facilitate recipes, formulations, methods of making beverages, provide operational data processing, perform data processing related to consumer interaction, and/or perform other data processing as may be required and or desired in a particular embodiment. Such operational data processing may include, for example and not as a limitation, equipment status, maintenance, service alerts, predictive restock, and/or other types and kinds of operational data processing as may be required and/or desired in a particular embodiment. Such consumer interaction support may include, for example and not as a limitation, consumer preferences, consumer beverage preferences, loyalty, gaming, prizes, media content, customizations, and/or other types and kinds of consumer interaction and/or data processing support as may be required and/or desired by a particular embodiment. In certain embodiments of the invention, one or more of the databases associated with the data processing resource 135, such as databases 150A, 150B, and 150C, may be associated with the beverage forming dispenser 100 via a network connection. Accordingly, any of the information that is maintained by the one or more databases may be accessed by a controller associated with the beverage forming dispenser 100, such as controller 105, and/or stored in one or more other databases associated with the controller, such as database 130. For purposes of disclosure, databases 130, 150A, 150B, and 150C are collectively or otherwise individually referred to herein as database 130.

With continued reference to FIG. 1, a beverage forming dispenser in accordance with some embodiments of the invention, such as beverage forming dispenser 100, may include or be associated with one or more machine readable code readers 155. Each of the one or more machine readable code readers 155 may be any suitable type of reader or group of readers, for example, a bar code, RFID, reflected light frequency, optical, etc. In one embodiment, a machine readable code reader 155 may be utilized to scan or read the beverage forming ingredient packages 114A-114Q prior to insertion into the ingredient matrix 112. In this regard, the controller 105 may be used to obtain information related to or associated with the beverage forming ingredient package, such as 114A, using information from the scan or read, and use such information to identify within the ingredient matrix 112 an optimum matrix location for placement of the beverage forming ingredient package. For example, data from a beverage forming ingredient package 114A, such as a serial number or identification code, can be utilized alone or correlated with previously stored information in a database, such as 130, or with data otherwise accessible or stored by data processing resource 135, which may identify one or more ingredients associated with the beverage forming ingredient package 114A. In another example, data from a beverage forming ingredient package 114A, such as an ingredient code or identifier, can be utilized alone or correlated with previously stored information in a database, such as 130, or with data otherwise accessible or stored by data processing resource 135, which may identify one or more ingredients associated with the beverage forming ingredient package 114A.

In addition, as beverage forming ingredient packages 114A-114Q are scanned and an optimum matrix location identified, package installation personnel can be informed where a particular beverage forming ingredient package 114A is to be located in the ingredient matrix 112 by way of one or more suitable output devices 160, such as a light emitting diode (LED) display indicator. The personnel may additionally or alternatively be informed by way of other types and kinds of output devices or display indicators as may be required and/or desired in a particular embodiment. Other embodiments may include output devices such as LCD screens, input/output (I/O) interfaces, and/or audio interfaces. The package installation personnel may additionally be prompted for user input via one or more user options or selections associated with the beverage forming dispenser 100 and/or the particular beverage forming ingredient package 114A. The one or more user options or selections that are utilized to prompt the user may be presented to the user in any suitable form, for example, via the one or more output devices 160. User input or selections may be communicated to the beverage forming dispenser 100 via one or more suitable input devices 165, such as a touchpad associated with a controller of the beverage forming dispenser, such as controller 105. Other embodiments may include input devices such as keypads, interactive displays, push buttons, voice recognition, etc.

In one embodiment, correct beverage forming ingredient package 114 insertion into the ingredient matrix 112 may be double checked or otherwise verified by scanning a machine readable code on the package (illustrated as 118A) and scanning a machine readable code located on the ingredient matrix 112 at the point of insertion (illustrated as 118B). In this regard, the controller 105 may then check or verify that the beverage forming ingredient package 114 is correctly located in the ingredient matrix 112. Additionally or alternatively, a machine readable code reader 170A that is associated with a particular matrix location in the ingredient matrix 112, such as a radio frequency identification (REID), may be utilized to read an RFID tag (illustrated as 118A) associated with the beverage forming ingredient package 114A prior to, during, and/or subsequent to its insertion into the ingredient matrix 112. In this regard, a controller, such as controller 105 may be used to obtain information related to or associated with the beverage forming ingredient package 114A, and use such information to identify or otherwise determine the location within the ingredient matrix 112 of the beverage forming ingredient package 114A.

A determination may also be made as to whether the beverage forming ingredient package 114A has been inserted into an appropriate location within the ingredient matrix 112. In accordance with one or more embodiments of the invention, a plurality of machine readable code readers may be associated with respective locations within the ingredient matrix 112. As beverage forming ingredient packages 114 are inserted into the ingredient matrix 112 and scanned, package installation personnel may be informed where the beverage forming ingredient package 114 is located in the ingredient matrix 112 by way of one or more suitable output devices 160, such as a light emitting diode (LED) display indicator. The package installation personnel may additionally or alternatively be informed by way of other types and kinds of output devices or display indicators as may be required and/or desired in a particular embodiment. Other embodiments can include output devices such as LCD screens, input/output (I/O) interfaces, and audio interfaces.

The package installation personnel may also be informed via one or more suitable output devices 160 of any determination(s) that a beverage forming ingredient package has been inserted into an incorrect location within the ingredient matrix 112. For example, if an optimal location in the ingredient matrix 112 has been determined for a beverage forming ingredient package, such as 114A, utilizing machine readable code reader 155, then the insertion into the optimal location may be verified by a machine readable code reader associated with the optimal location, such as machine readable code reader 170A. The package installation personnel may be informed of the correct insertion. If the beverage forming ingredient package is inserted into a different location than the optimal location, then a machine readable code reader associated with the different location may be utilized in a determination that the beverage forming ingredient package has not been properly inserted into the optimal location. The package installation personnel may then be notified of the improper insertion. As another example, if a beverage forming ingredient package, such as 114A, is replaced in the ingredient matrix 112 with a new beverage forming ingredient package, a machine readable code reader associated with the location in the ingredient matrix 112 may be utilized in association with a determination that the new beverage forming ingredient package may be inserted into the location. For example, if the location is associated with a cherry syrup, then a determination may be made as to whether the new beverage forming ingredient package is a cherry syrup.

Furthermore, in one embodiment, a RFID tag associated with a beverage forming ingredient package, such as 114A, may be written to and/or modified such that the beverage forming ingredient package 114A is prevented or otherwise limited from being inserted into a second or other beverage forming dispenser. In this regard, should service personnel attempt to read the RFID tag a second time in an attempt to relocate the package 114A into a second beverage forming dispenser it would be known to a controller associated with the second beverage forming dispenser that the package 114A has previously been inserted into a different beverage dispenser, and as such, would not allow the package 114A to be operated in a second ingredient matrix. In operation, this can prevent partially used beverage forming ingredient packages from being transferred between beverage forming dispensers. Similarly, a RFID tag associated with a beverage forming ingredient package, such as 114A, may be written to and/or modified such that the beverage forming ingredient package 114A is prevented or otherwise limited from being inserted into certain locations in the ingredient matrix 112 of a beverage forming dispenser, such as beverage forming dispenser 100.

With continued reference to FIG. 1, a beverage forming dispenser in accordance with certain embodiments of the invention may include a REID reader/writer, such as 170A, that is associated with each insertion location within the ingredient matrix 112. In this regard, as a beverage forming ingredient package, such as 114A, is inserted into the ingredient matrix 112, a unique RFID reader/writer, such as 170A, can be associated with each respective ingredient matrix 112 insertion location, and can read and/or write to the respective beverage forming ingredient package, such as 114A.

Illustrated in FIG. 1 is an example of how a REID reader/writer 170A may be located adjacent to an insertion location within an ingredient matrix 112 where a particular beverage forming ingredient package, such as 114A, is to be inserted. As such, a RFID reader/writer 170B may be associated with an insertion location for package 114B, and similarly 170C may be associated with 114C, continuing through the total number 'N' of insertion locations and packages represented as 170N and 114N respectively. In one embodiment, there may be forty four (44) RFID reader/writers 170A-170N associated with beverage forming ingredient packages 114A-114N though not all ingredients such as, for example and not as a limitation, carbonated water 114O, sweetener 114P, and water 114Q, may have respective REID reader/writers. For purposes of disclosure, a RFID reader/writer 170A-170N may be referred to as RFID reader/writer 170 or REID reader 170, and 'N' may represent the total number of objects such as packages 114N or REID readers/writers 170N. In one embodiment 'N' may be any number, and in another embodiment, 'N' may be a number less than or in excess of forty four (44).

In one embodiment, a RFID reader 170 may be utilized to read an RFID tag associated with a beverage forming ingredient package, such as 114A, upon insertion of the package 114A into the ingredient matrix 112. In this regard, the controller 105 may be used to obtain information related to or associated with the beverage forming ingredient package 114A. Such information may be used to identify within the ingredient matrix 112 an optimum or desired matrix location for placement of the beverage forming ingredient package 114A. In this regard, information related to the beverage forming ingredient package 114A may be manually entered into the controller 105 such that an optimum or desired matrix location can be identified. Once identified, a service personnel may be informed of the optimum or desired location within the ingredient matrix 112 by way of a suitable output devices 160, such as a light emitting diode (LED) display indicator, and/or informed by way of other types and kinds of output devices or display indicators as may be required and/or desired in a particular embodiment. Other embodiments may include output devices such as LCD screens, input/output (I/O) interfaces, and audio interfaces.

Furthermore, in one embodiment, a RFID tag associated with a beverage forming ingredient package, such as 114A, may be written to and/or modified such that the beverage forming ingredient package 114A is prevented or otherwise limited from being utilized by a second or other beverage forming dispenser. In this regard, should service personnel attempt to read the REID tag a second time in an attempt to relocate the package into a second beverage forming dispenser it would be known to a second controller, via tag information or a network component, that the package has previously been inserted into a different beverage dispenser and as such would not allow the package to be operated in a second ingredient matrix. In operation, this may prevent or otherwise limit partially used packages from being transferred between beverage forming dispensers by way of determining via tag information or a network component the amount of an ingredient remaining within a particular beverage forming ingredient package.

In one embodiment, information associated with an amount of an ingredient remaining in a beverage forming ingredient package 114 may be written to a RFID tag associated with a beverage forming ingredient package, such as 114A. Such information may be written to the REID tag after each use or prior to removal of the beverage forming ingredient package 114A from the ingredient matrix 112.

Figure 2A:
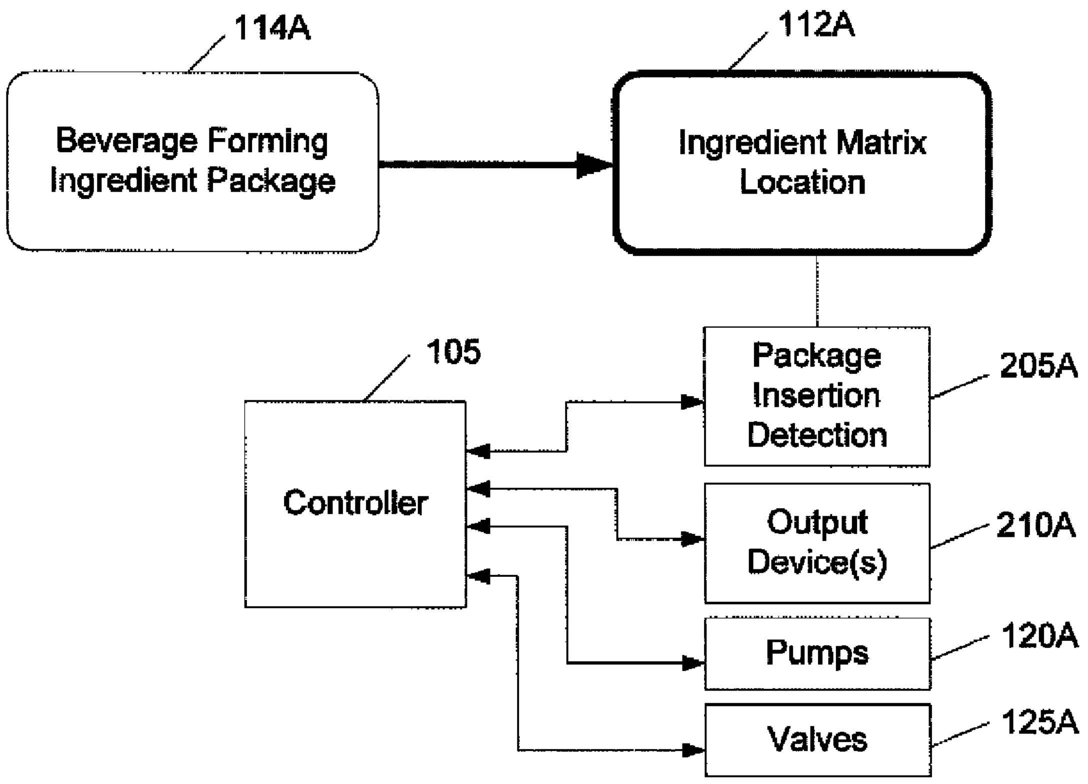
FIG. 2A illustrates one example of an operational relationship between a controller and an ingredient matrix location within an ingredient matrix in accordance with an embodiment of the invention.

Referring to FIG. 2A, there is illustrated one example of an operational relationship between a controller, such as controller 105, and an ingredient matrix location within an ingredient matrix, such as ingredient matrix 112. In one embodiment, a beverage forming ingredient package 114A may be inserted into an ingredient matrix location 112A. In operation, there may be dozens of individual packages 114A-114N which may be uniquely inserted into dozens of ingredient matrix locations 112. In this regard, each of the packages 114A-114N may be metered, pumped, and monitored to form beverages. FIG. 2A illustrates one such embodiment of one of the many package matrix location operational relationships. In a plurality of example embodiments the operational relationship depicted in FIG. 2A may be replicated many times in accordance with the size and number of ingredient matrix locations. Although controller 105, which may be a central controller, is shown in FIG. 2A as being associated with the ingredient matrix location, in certain embodiments of the invention, other controllers may be associated with an ingredient matrix location as desired. For example, the beverage forming dispenser 100 may include a distributed architecture in which each ingredient matrix location may be associated with a respective controller, as described in greater detail below with reference to FIG. 3. As another example, the beverage forming dispenser 100 may include a distributed architecture in which individual ingredient matrix locations and/or a subsets of the ingredient matrix locations are associated with respective controllers.

In one embodiment, package 114A may be inserted into ingredient matrix location 112A. To meter, pump, and monitor ingredient contents, a controller, such as controller 105, may be operationally related to a package insertion detection interface 205A, one or more output devices 210A, one or more pumps 120A, and/or one or more valves 125A. In a plurality of example embodiments, a combination of some or all of these and other features may be used as may be required and/or desired in a particular embodiment. As such, some embodiments may have less than all of the illustrated features while some may have more. As an example and not as a limitation, valves, such as valves 125, might not be required for each of the packages 114A-114N inserted in certain of the matrix locations 112A-112N. As such, if a valve, such as valve 125A, is not needed in the embodiment, the embodiment may be effectuated without the valve. This adding and/or subtracting of features for a matrix location configuration may apply for each of the features illustrated in FIG. 2A and may vary as may be required and/or desired in a particular embodiment.

In operation, the package insertion detection interface 205A may be a limit switch, Hall Effect sensor, optical, and/or other types and kinds of package insertion detection interfaces as may be required and/or desired by a particular embodiment. In any instance, a package insertion detection interface 205A may be used to detect the insertion of a package, such as 114A, into a respective or particular ingredient matrix location, such as 112A.

Figure 2B:
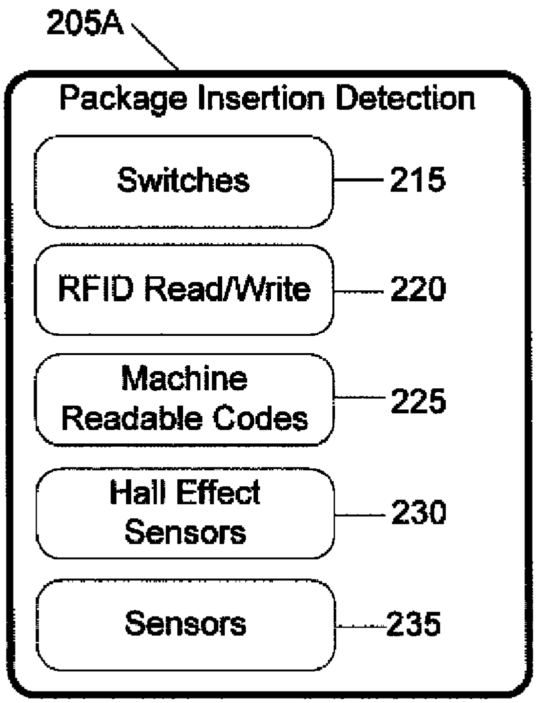
FIG. 2B illustrates one example of a plurality of package insertion detection interfaces in accordance with an embodiment of the invention.

Referring to FIG. 2B, there is illustrated one example of a plurality of package insertion detection interfaces 205A. Such interfaces 205A may include, for example and not limitation, as required and/or desired by a particular embodiment, switches 215, RFID reader/writer 220 (also referred to as RFID reader as shown in FIGS. 1E and 1F as 120), machine readable code reader 225, Hall Effect sensors 230, and/or sensors 235. For purposes of disclosure, RFID reader/writer 220, machine readable code reader 225, and manually entered information and data related to a beverage forming ingredient package, such as 114A, can be referred to as an ingredient package identifier.

Display indicator interface 210A in FIG. 2A may be a user interface or an output device such as a light emitting diode (LED) display interface, other display interface, or type of indicator or output device as may be required and/or desired in a particular embodiment. In operation, interface 210A may be utilized to direct service personnel to matrix locations and/or inform service personnel of certain operational status, operational condition, and/or utilized, for other purposes, as may be required and/or desired in a particular embodiment.

For example, as needed, one or more pumps, such as pumps 120A, may be utilized to pump ingredient contents from a particular package, such as 114A, once the package 114A has been correctly or suitably inserted into a respective matrix location, such as 112A, as may be required and/or desired in a particular embodiment In addition, as needed, one or more valves, such as valves 125A may be utilized to meter the flow of ingredients from a respective package, such as 114A, from a respective matrix location, such as 112A, or from the ingredient matrix, such as 112, during beverage formation as required and/or desired in a particular embodiment.

Figure 2C:
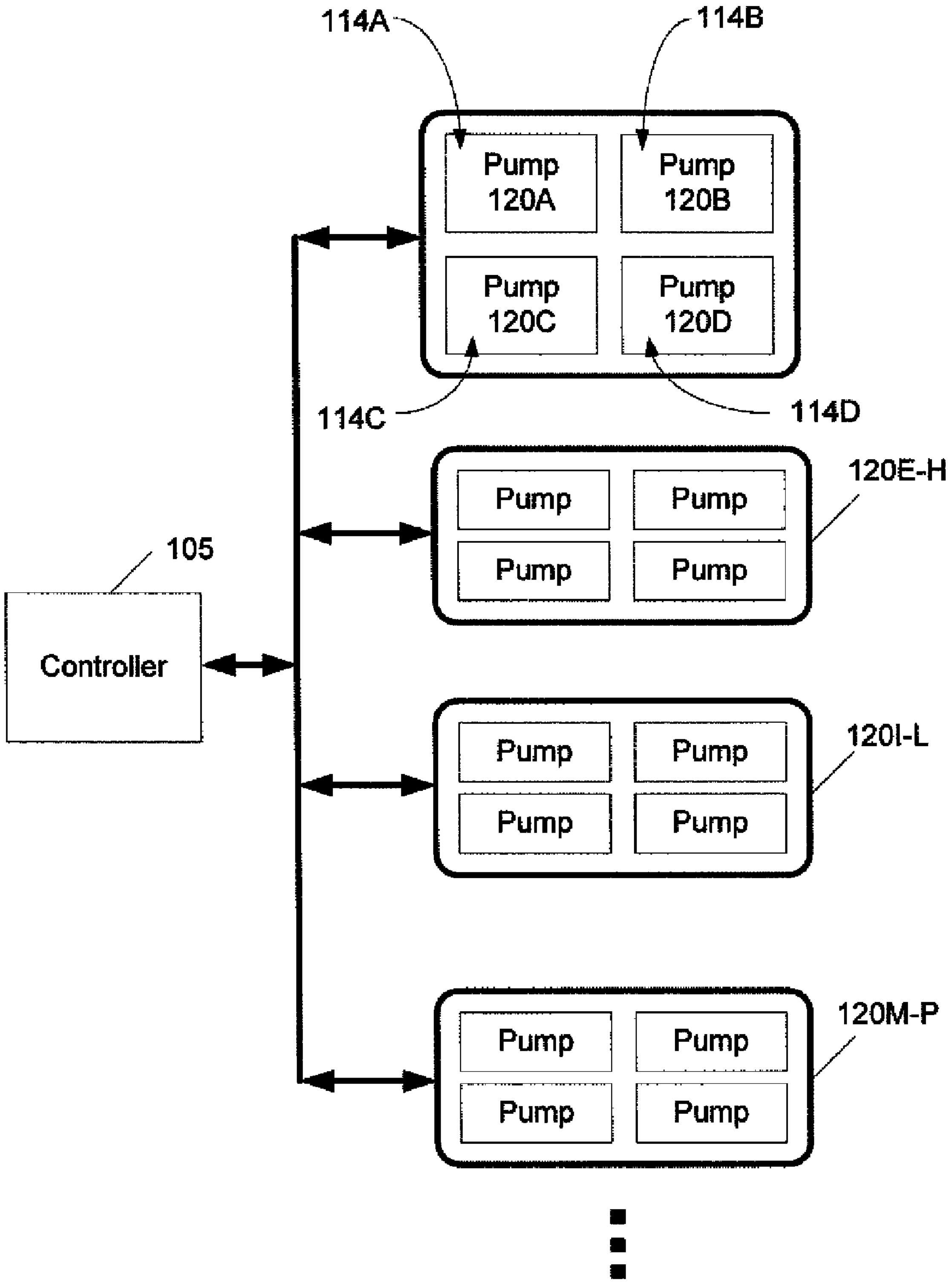
FIG. 2C illustrates one example of a plurality of beverage forming ingredient packages being associated with a plurality of pumps in accordance with an embodiment of the invention.

Referring to FIG. 2C, there is illustrated one example of a plurality of beverage forming ingredient packages being associated with a plurality of pumps. In one embodiment, a plurality of pumps, such as 120A-120P, may be operationally related to a controller, such as controller 105. Additionally, a plurality of beverage forming ingredient packages, such as 114A-114D, may be associated with some or all of the plurality of pumps, such as 120A-120D. In operation, controller 105 may create an association between the plurality of beverage forming ingredient packages 114A-114D and the pumps 120A-D and/or valves, shown as 125 in FIG. 2A. Although the association is illustrated in FIG. 2C as a one to one association of a pump, such as pump 120A to a beverage forming ingredient package, such as package 114A, other associations may be utilized as desired in various embodiments of the invention. For example, a plurality of pumps and/or valves may be associated with each beverage forming ingredient package.

An association between a plurality of beverage forming ingredient packages, such as 114A-114D, and a plurality of pumps, such as 120A-120D, may be stored as a last known good association such that each time the beverage forming dispenser is powered up and/or reset, a check for conflicts of the current association between the plurality of beverage forming ingredient packages and the pumps can be made. Such conflicts may include, for example and not as a limitation, a pungent beverage forming ingredient package being incorrectly located in the ingredient matrix, an agitation required beverage forming ingredient package being located in a non-agitated ingredient matrix location, at least two beverage forming ingredient packages being age and/or otherwise incompatible, and/or other types and kinds of conflicts, monitoring, and determination as may be required and or desired in a particular embodiment.

In one embodiment, as related to a service technician making repairs or a service person restocking the beverage forming dispenser, beverage forming ingredient packages and pumps may from time to time be removed, replaced, exchanged, or in other ways the dispenser and ingredients modified. In these conditions, it may be likely that beverage forming ingredient packages are moved to different slots and/or pump/valve assemblies are changed. As such, when the beverage forming dispenser is next powered up or reset only then will the changes be determinable and of operational consequence. For example and not as a limitation, if there is a beverage forming ingredient package in the incorrect or an unsuitable ingredient matrix location, the incorrect recipe may be poured. In addition, a replacement pump associated with an incorrect or unsuitable beverage forming ingredient package may cause the ratio of the pour to be incorrect, resulting in poor beverage quality and/or taste. In this regard, often different ingredients have different viscosities. Furthermore, as viscosity of the ingredients change, from ingredient to ingredient, various characteristics of the pumps may be changed or otherwise adjusted in order to deliver the correct or suitable ingredient at a suitable ratio per the recipe.

Characteristics may be referred to herein as operational characteristics and may include, for example and not as a limitation, electrical and/or mechanical characteristics of at least one of the pumps to control or compensate for a viscosity of a particular ingredient being pumped.

An advantage of an embodiment of the invention is that once a known good association exists, the dispenser may obtain information related to a plurality of beverage forming ingredient packages located in the ingredient matrix, determine an association related to the operational relationship between each of the plurality of beverage forming ingredient packages and each of a plurality of pumps, determine if the association has changed by comparison to the last known good association, and modify the association if the association has changed to accommodate the new association.

In addition, another advantage of an embodiment of the invention can be that the plurality of said beverage forming ingredient packages configured within the ingredient matrix may be compared to a database of beverage recipes to form an available beverage menu.

Referring to FIG. 2C, there is illustrated a controller, such as controller 105, operationally related to a plurality of pumps, such as pumps 120A-P. In addition, there is an association made between the pumps 120A-D and a plurality of beverage forming ingredient packages 114A-D. In this regard, package 114A may be associated with pump 120A, package 114B may be associated with pump 120B, package 114C may be associated with pump 120C, and package 114D may be associated with pump 120D. In one embodiment, an association between any number of pumps 120A-P and packages 114A-D may be determined and stored as a last known good association. Additionally, in certain embodiments, more than one pump may be associated with a beverage forming ingredient package. On power up or reset, the plurality of packages 114 may be checked to determine whether the association with the plurality of pumps has changed (as compared the last known good association). If the association has changed, then the controller may attempt to dynamically reconfigure the pumps and packages association. If there are no conflicts, then the association may be updated and stored as the last known good association, and the system may start normally. If there are conflicts, then one or more prompting, attentions, and/or receipts of input may be needed or required before normal dispenser operation can resume.

With continued reference to FIG. 2C, a beverage forming dispenser, such as beverage forming dispenser 100 of FIG. 1, may include a central controller, such as controller 105, that controls the operation of the beverage forming dispenser 100. In one embodiment, the controller 105 may be in communication with a plurality of pumps, such as pumps 120A-120P (or 120A-120N in FIG. 1), and the controller 105 may control the operation of the pumps. As such, the controller 105 may directly control the operation of the pumps 120A-120P to form a variety of beverages. Although FIG. 2C illustrates a central controller, it will be understood that a plurality of controllers may be utilized in accordance with embodiments of the invention. For example, a plurality of nodes and/or controllers may be arranged or associated in a distributed architecture, as explained in greater detail below with reference to FIGS. 2D and 3.

Figure 2D:
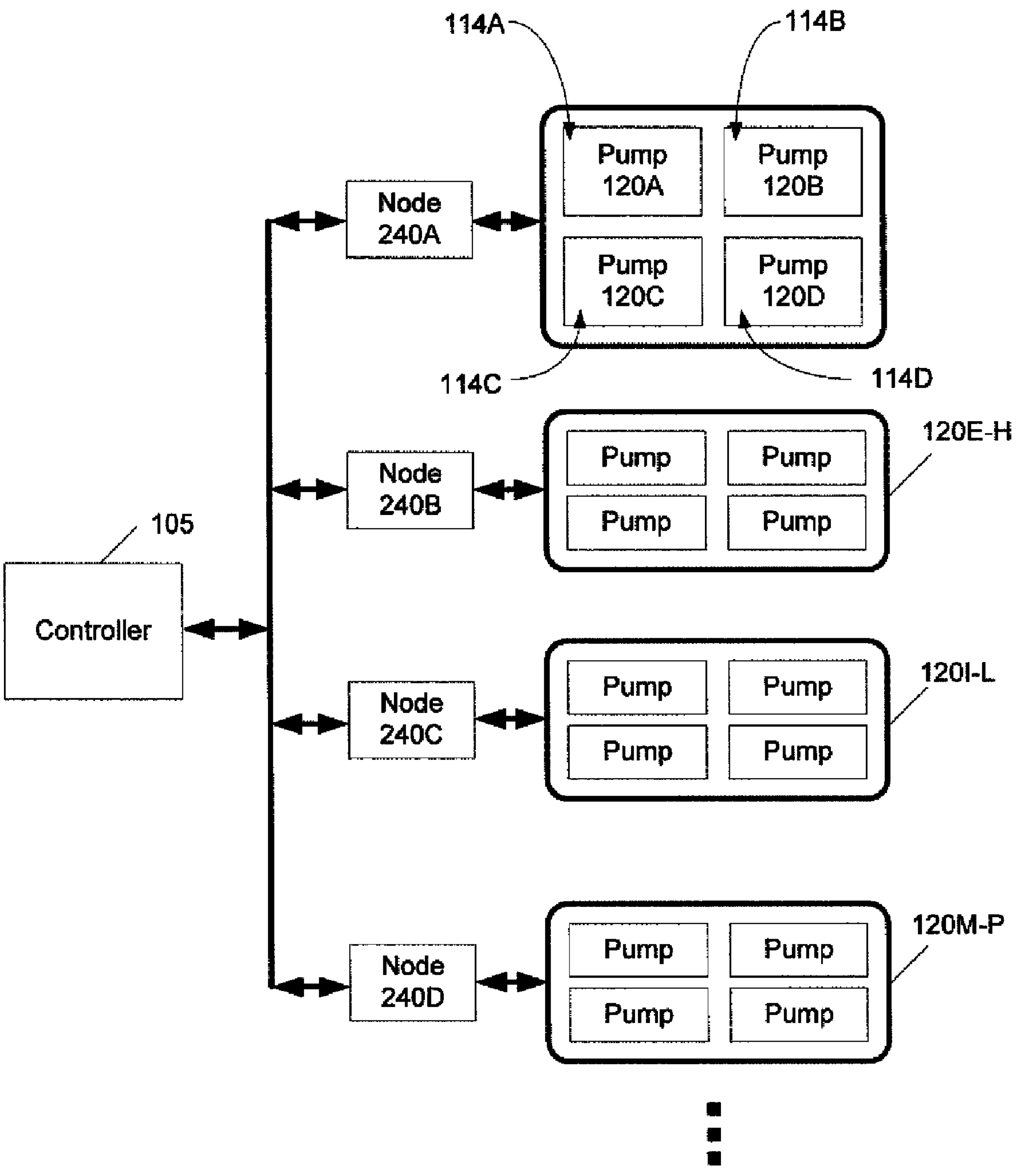
FIG. 2D illustrates one example of a plurality of beverage forming ingredient packages being associated with a plurality of pumps and interfaced to a controller by way of a plurality of bus nodes in accordance with an embodiment of the invention.

Referring to FIG. 2D, there is illustrated one example of a plurality of beverage forming ingredient packages, such as 114A-114D, being associated with a plurality of pumps, such as 120A-D, and interfaced to a controller 105 by way of one or more of a plurality of nodes, such as node 240A. In one embodiment, a plurality of nodes 240A-240D may be utilized to interface a plurality of pumps/valves 120A-120P, 125 (shown in FIG. 2A) to a network bus. In this regard, the bus may form a relatively more efficient way for a controller 105 to data communicate and/or control the pumps/valves 120A-120P, 125. In one embodiment, the bus node 240A-240D may effectuate embedded microcontroller functionality and/or be a network interface device effectuating network communications between controllers and devices such as pumps/valves 120A-120P, 125 and/or other types and kinds of devices as may be required and or desired in a particular embodiment. Such network communications may include CAN, OPEN CAN, RS232, ETHERNET, RS485, wired, wireless, and/or other types and kinds of bus node effectuated network communications as may be required and or desired in a particular embodiment.

An advantage of an embodiment of the invention may be that that once a known good association exists, the dispenser may obtain information related to a plurality of beverage forming ingredient packages located in the ingredient matrix, determine an association related to the operational relationship between each of the plurality of beverage forming ingredient packages, each of a plurality of pumps, each of the plurality of nodes 240A-240D, determine if the association has changed by comparison to the last known good association, and modify if the association has changed, the beverage forming dispenser to accommodate the new association. In this regard, if a node is replaced or relocated in the ingredient matrix, the last known good association may be utilized to detect, resolve conflicts, and/or update a new association as may be required and/or desired in a particular embodiment.

Figure 3:
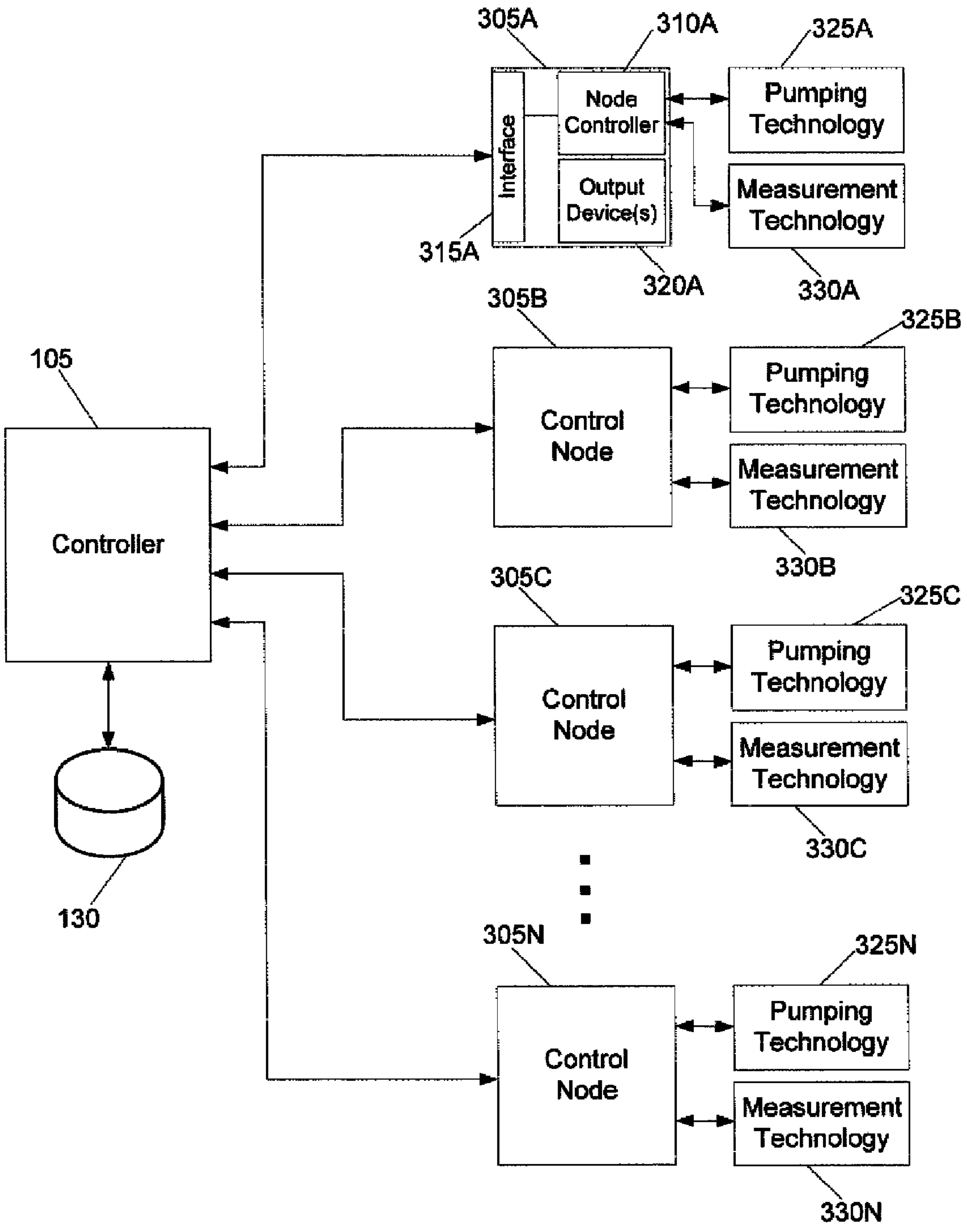
FIG. 3 illustrates one example of a plurality of control nodes being associated with a controller in accordance with an embodiment of the invention.

Referring to FIG. 3, there is illustrated one example of a plurality of control nodes, such as 305A-305N, being associated with a controller of a beverage forming dispenser, such as controller 105. In one embodiment, each control node 305A-305N may be associated with a particular beverage forming ingredient such as ingredients 114A-114Q shown in FIG. 1. However, in certain embodiments, each control node 305A-305N may be associated with a plurality of beverage forming ingredients.

In one embodiment in which each control node 305A-305N may be associated with a beverage forming ingredient, such as 114A-114Q shown in FIG. 1, each control node 305A-305N may control the pumping of a respective beverage forming ingredient, such as 114A-114Q. In this regard, each control node 305A-305N may be in communication with respective pumping technology 325A-325N and/or measurement technology 330A-330N associated with the beverage forming ingredients. In one embodiment, a control node 305A may be associated with pumping technology 325A and/or measurement technology 330A for a first beverage forming ingredient, such as 114A show in FIG. 1. As such, a control node 305B may be associated with pumping technology 325B and/or measurement technology 330B for a second beverage for a second beverage forming ingredient, such as 114B shown in FIG. 1. Similarly, control node 305C may be associated with pumping technology 325C and/or measurement technology 330C, continuing through a total number 'N' of control nodes, pumping technology, and/or measurement technology represented as 305N, 325N, and 330N respectively.

In one embodiment, suitable pumping technology, such as 325A, may be utilized to precisely pump a beverage forming ingredient, such as 114A shown in FIG. 1, for a beverage. A wide variety of different pumping technologies may be utilized as desired in various embodiments of the invention to precisely pump a beverage forming ingredient 114A. For example, one or more suitable solenoid pumps may be utilized to pump a beverage forming ingredient 114A. In one embodiment, one or more NME1C Evolution Micropumps, manufactured by Ulka S.r.l. may be utilized to pump a beverage forming ingredient, such as 114A. In operation, a micropump may be energized for approximately 15 ms, causing a plunger to be pulled back, thereby drawing or pulling a beverage forming ingredient into the micropump. The micropump may then be actuated causing the beverage forming ingredient to be passed downstream through the pump. In one embodiment, four (4) solenoid pumps may be utilized to pump a beverage forming ingredient, such as 114A. Other types of pumps, combinations of pumps, and suitable pumping technology may be utilized in accordance with embodiments of the invention as may be required and/or desired in a particular embodiment.

A control node, such as control node 305A, may be associated with the pumping technology, such as 325A, that is utilized to pump a particular beverage forming ingredient, such as 114A. One advantage of associating a control node 305A with a particular beverage forming ingredient 114A is that the control node 305A may be configured to operate in conjunction with the pumping technology 325A utilized in conjunction with the particular beverage forming ingredient 114A. In this regard, if different pumping technology is utilized in conjunction with different beverage forming ingredients, then respective control nodes associated with the different beverage forming ingredients may utilize and/or incorporate different components and/or control logic as required by the pumping technologies that are utilized. Additionally, if the pumping technology associated with a particular beverage forming ingredient is updated, altered, or replaced, then the associated control node may be updated, altered, or replaced to account for the change in the pumping technology. By updating, altering, or replacing a control node, it may not be necessary to update or replace a central controller associated with a beverage forming dispenser, such as controller 105. In other words, the central controller 105 may function independently of the pumping technology that is utilized in association with the various beverage forming ingredients 114.

In one embodiment, suitable measurement technology, such as 330A, may be utilized to monitor a volume or amount of beverage forming ingredient, such as 114A shown in FIG. 1, that is dispensed for a beverage. A wide variety of different measurement technologies may be utilized as desired in various embodiments of the invention to measure the pumping of a beverage forming ingredient 114A. As one example of measurement technology, one or more counters may be utilized to determine the number of times that a pump, such as a solenoid pump, has been actuated. In this regard, if the volume or amount of beverage forming ingredient that is pumped with each actuation of the solenoid pump is know or closely estimated, then the total volume or amount of beverage forming ingredient that is pumped may be determined or calculated by suitable components of the measurement technology, by an associated control node, such as node 305A, and/or by an associated controller, such as controller 105. For example, approximately 0.01 microliters of beverage forming ingredient may be pumped with each actuation of a solenoid pump. As the solenoid pump is actuated a plurality of times during the dispense of a beverage, a counter may be utilized to track the number of actuations and a determination of the total amount of a beverage forming ingredient that is pumped for a beverage may be made. As an extension to this example, one or more counters may track the number of actuations of a plurality of solenoid pumps associated with a beverage forming ingredient package 114. In one embodiment, four (4) solenoid pumps may be associated with a beverage forming ingredient package, such as 114A, and the four solenoid pumps may be utilized to pump beverage forming ingredient from the package 114A. One or more counters may then be utilized to track the number of actuations for the plurality of solenoid pumps.

As another example of measurement technology, one or more suitable flow meters may be utilized in association with measuring an amount or volume of beverage forming ingredient that is pumped from a beverage forming ingredient package, such as 114A. A wide variety of flow meters may be utilized in association with embodiments of the invention including, but not limited to, suitable pressure-velocity liquid flow meters, suitable paddle wheel style flow meters, and/or suitable gear meters. A paddle wheel style flow meter may utilize an emitter/detector light emitting diode (LED) pair in association with a paddle wheel that cuts through a beam generated by the LED pair as the paddle wheel rotates, thereby allowing an accurate measurement of flow rate. A gear meter may utilize a set of gears that rotate as fluid flows through the gears. A magnet may be attached to a shaft that is connected to one of the gears. As the shaft rotates, one or more encodes may be utilized to detect the rotation and determine a flow rate. In one embodiment, one or more flow meters may be utilized in association with continuous ingredients supplies, such as the carbonated water supply 114O and/or the water supply 114Q shown in FIG. 1. In operation, during the dispense, of a beverage, one or more flow meters may be utilized to measure the flow of a beverage forming ingredient, such as the carbonated water supply 114O, as it is pumped or otherwise provided to a nozzle of a beverage forming dispenser for dispense, such as nozzle 140. The measured flow rate may then be processed by suitable components of the measurement technology, by an associated control node, such as node 305A, and/or by an associated controller, such as controller 105 in order to determine or calculate an amount or volume of carbonated water that is provided to the nozzle 140 for dispense.

In certain embodiments, more than one type of suitable measurement technology may be utilized in association with a beverage forming dispenser, such as dispenser 100 shown in FIG. 1. For example, a first type of measurement technology may be utilized in association with measurements of an amount or volume of beverage forming ingredients that are supplied from beverage forming ingredient packages, such as 114A, while a second type of measurement technology may be utilized in association with measurements of an amount or volume forming ingredients that are supplied from a continuous supply, such as 114O. Additionally, in certain embodiments, more than one type of suitable measurement technology may be utilized in association with a single beverage forming ingredient. The measurements obtained from the various measurement technologies that are utilized may be compared with one another and/or averaged together in order to obtain greater accuracy.

A control node, such as control node 305A, may be associated with the measurement technology, such as 330A, that is utilized to measure the amount or volume of a particular beverage forming ingredient, such as 114A, that is pumped. Additionally, the measurement technology 330A may be remote to and/or incorporated into the associated control node 305A. One advantage of associating a control node 305A with a particular beverage forming ingredient 114A is that the control node 305A may be configured to operate in conjunction with the measurement technology 330A utilized in conjunction with the particular beverage forming ingredient 114A. In this regard, if different measurement technology is utilized in conjunction with different beverage forming ingredients, then respective control nodes associated with the different beverage forming ingredients may utilize and/or incorporate different components and/or control logic as required by the measurement technologies that are utilized. Additionally, if the measurement technology associated with a particular beverage forming ingredient is updated, altered, or replaced, then the associated control node may be updated, altered, or replaced to account for the change in the measurement technology. By updating, altering, or replacing a control node, it may not be necessary to update or replace a central controller associated with a beverage forming dispenser, such as controller 105. In other words, the central controller 105 may function independently of the measurement technology that is utilized in association with the various beverage forming ingredients 114.

In one embodiment, a control node, such as node 305A may include a node controller, such as node controller 310A, an interface, such as interface 315A, and/or one or more output devices, such as device(s) 320A. The node controller 310A may control the operations of the control node 305A. The node controller 310A may be any suitable controller, computing device, or plurality of devices, for example, a microcontroller, minicomputer, etc. The node controller 310A may include similar components and functionality to that described above with reference to FIG. 1 for the controller 105. For example, the node controller 310A may include a memory and a processor. The processor may execute stored programmed logic (e.g., software) in accordance with embodiments of the invention in order to control the operation of the control node 305A, the associated pumping technology 325A, and/or the associated measurement technology 330A.

In one embodiment, the node controller 310A may store data associated with a beverage forming ingredient that is monitored and controlled by the control node 305A. The stored information or a portion of the stored information may be obtained from a variety of sources. For example, the stored information may be obtained from the controller 105 once the control node 305A has been associated with a beverage forming ingredient packet, such as 114A. Additionally or alternatively, at least a portion of the stored information may be obtained from the beverage forming ingredient packet 114A via an associated machine readable code reader, such as 170A shown in FIG. 1. A wide variety of information associated with the beverage forming ingredient may be stored by the control node 305A as desired in embodiments of the invention. In one embodiment, the control node 305A may store information associated with the fluid characteristics of the beverage forming ingredient and/or with the associated pumping technology 325A. For example, the control node 305A may store information in a calibration matrix that outlines parameters for pumping various fluids or fluid types including, but not limited to, viscosities. The stored information may be utilized to control the pumping of a beverage forming ingredient. For example, the stored information may establish and/or be utilized to determine one or more settings or parameters associated with the pumping technology 325A utilized to pump a beverage forming ingredient. A wide variety of settings or parameters associated with the pumping technology may be established or determined utilizing the stored information such as, a voltage utilized for a pumping operation and/or an amount or volume of beverage forming ingredient that will be pumped by the pumping technology 325A during a pumping operation.

As another example of information that may be stored by a control node 305A, a control node 305A may store an ingredient table associated with one or more beverage forming ingredients. The ingredient table may include a wide variety of information including, but not limited to, viscosity information and/or shelf life information associated with one or more beverage forming ingredients. The control node 305A that it is monitoring and/or control the pumping of a beverage forming ingredient may access at least a portion of this information in order to determine that a beverage forming ingredient is still capable of being pumped and/or whether the beverage forming ingredient is being pumped properly.

The node controller 310A may receive input or data from other components of the control node 305A, from associated pumping technology 325A, from associated measurement technology 330A, and/or from other components of a beverage forming dispenser, such as controller 105, as desired in embodiments of the invention. The node controller 320A may also output data or control the output of data to other components of the control node 305A, to associated pumping technology 325A, to associated measurement technology 330A, to one or more other components of a beverage forming dispenser, such as controller 105, and/or to one or more suitable output devices 320A, as desired in embodiments of the invention. The one or more suitable output devices 320A may include, for example, LED indicators, displays, etc.

The interface 315A may facilitate communication between the node controller 310A and the controller 105. The interface 315A may be integrated into the node controller 310A or, alternatively, situated remotely to the node controller 310A. Additionally, the interface 315A may be utilized to facilitate communication between the node controller 310A and the associated pumping technology 325A, the associated measurement technology 330A, and/or the one or more output devices 320A.

In one embodiment, a control node, such as node 305A may be in communication with a controller of a beverage forming dispenser, such as controller 105. The controller 105 may be a central controller within a distributed architecture. In one embodiment, a control node, such as 305A, may be in communication with a controller, such as 105, via suitable network communication. Such network communications may include CAN, OPEN CAN, RS232, ETHERNET, RS485, wired, wireless, and/or other types and kinds of network communications as may be required and or desired in a particular embodiment.

In one embodiment, once a beverage is selected for dispense, the controller 105 may access a recipe to form the selected beverage from an associated database, such as database 130. The recipe may indicate the beverage forming ingredients that are needed to dispense the selected beverage and the ratio of the needed ingredients. The controller 105 may communicate information associated with a dispense of a needed beverage forming ingredient to a control node, such as 305A, associated with the beverage forming ingredient. The communicated information 105 may include information associated with the desired ratio, a desired flow rate of the beverage forming ingredient, a desired volume of the beverage forming ingredient and/or other information as may be desired in an embodiment of the invention. The controller 105 may also communicate an order or command to the control node 305A to commence the dispense of the beverage forming ingredient utilizing the desired flow rate, ratio and/or volume. The commence order may be communicated concurrently with or subsequent to the communication of the information associated with the desired flow rate ratio and/or volume. In response to the commence order, the control node 305A may cause the beverage forming ingredient to be dispensed in accordance with the desired flow rate, ratio and/or volume. The control node 305A, in association with the pumping technology 325A and the measurement technology 330A may monitor and precisely control the dispense of the beverage forming ingredient. In this regard, each beverage forming ingredient for a selected beverage may be precisely monitored and controlled by associated control nodes, such as 305A-N.

According to certain embodiments of the invention, a beverage forming dispenser, such as dispenser 100, may be configured to dispense portion control amounts or volumes of selected beverages. The portion control dispenses, also referred to as portion controls, may be configured according to input and/or preferences of a customer, consumer, or user of the beverage forming dispenser 100. The portion control dispenses may be quickly and easily programmed and configured for the beverage forming dispenser 100. In one embodiment, portion control dispenses may be calibrated or initialized for multiple beverage selections concurrently with one another. In other words, a simplified procedure, method, or process may be utilized to calibrate or configure portion control dispenses for multiple beverage selections. Additionally, portion control dispenses may be calibrated or initialized for multiple cup sizes or pour sizes for one or more of the beverage selections.

Figure 4:
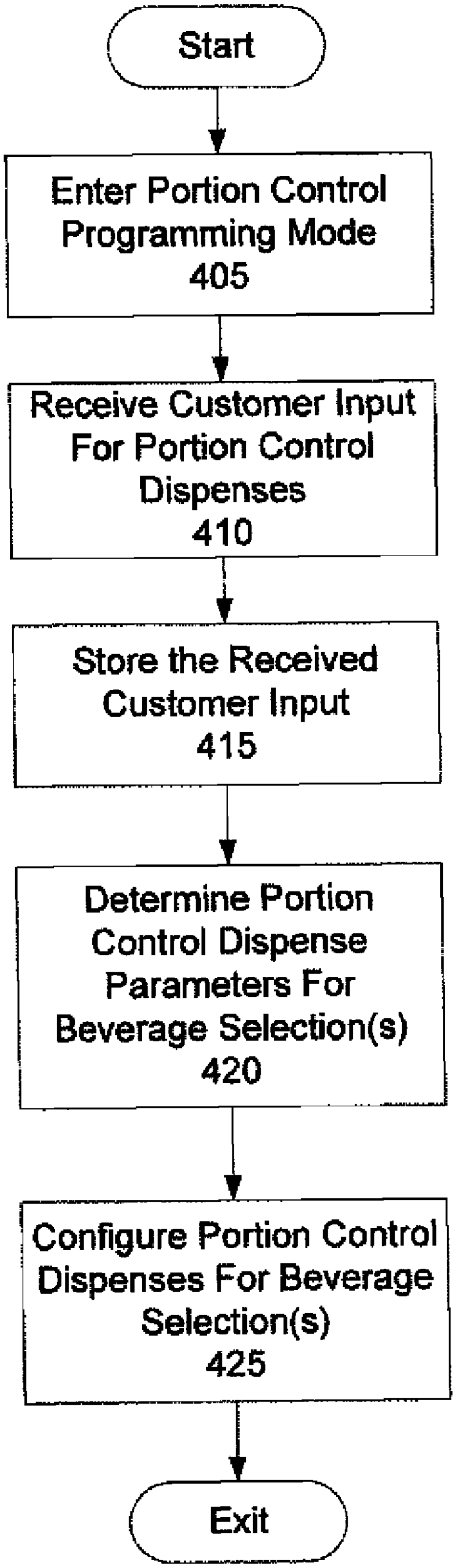
FIG. 4 illustrates one example of a method of establishing portion control dispenses for a beverage forming dispenser in accordance with an embodiment of the invention.

Referring to FIG. 4, there is illustrated one example of a method of establishing portion control dispenses for a beverage forming dispenser, such as 100, in accordance with an embodiment of the invention. In one embodiment, establishing portion control dispenses includes entering a portion control programming mode associated with the beverage forming dispenser 100, receiving input associated with customer preferences for portion control dispenses, storing the received input, determining portion control dispense parameters for one or more beverage selections offered by the beverage forming dispenser 100, and configuring portion control dispenses for the one or more beverage selections.

In block 405, a portion control programming mode may be entered into by the beverage forming dispenser 100. The portion control programming mode may facilitate the input of customer or consumer options or preferences associated with portion control dispenses. In this regard, the portion control dispenses of the beverage forming dispenser 100 may be customized to accommodate different customer preferences and/or operating environments associated with the beverage forming dispenser. In one embodiment, the portion control programming mode may be entered by a technician or customer entering a particular sequence of keys or commands via one or more appropriate input devices associated with the beverage forming dispenser 100, such as input devices 165 shown in FIG. 1. In one embodiment, a technician may facilitate the input of customer preferences for portion control dispenses. For purposes of this disclosure, the user of customer input or consumer input for purposes of inputting preferences for portion control dispenses may refer to the input of these preferences by a technician that is configuring the beverage forming dispenser 100. Thus, a key or input sequence to enter a portion controlling programming mode may not be known by a customer or consumer.

A wide variety of different key or input sequences may be utilized as desired in various embodiments of the invention. Additionally, it will be appreciated that one or more other methods, techniques, devices, or dispenser components may be utilized in association with entering a portion control programming mode, either as an alternative to or in addition to the entering of a key or input sequence. For example, the beverage forming dispenser 100 may include suitable security devices that at least in part control the access of the portion control programming mode. These security devices may include mechanical, electrical or electromechanical locking mechanisms, biometric scanning devices, etc. Once the portion control programming mode has been entered, then processing may move to block 410.

In block 410, customer input may be received for portion control dispenses. The received customer input may be utilized to determine and configure portion control dispense parameters for a plurality of beverage selections. The portion control dispense parameters may also be referred to as portion control parameters. Customer input may be received via one or more suitable input devices, such as input devices 165 shown in FIG. 1. For example, customer input for portion control dispenses may be received via a control panel, touchpad, or interactive display associated with the beverage forming dispenser. As another example, customer input may be received via the use of an appropriate data storage device, such as a removable data storage device that may be utilized to communicate the customer input to the beverage forming dispenser 100. As another example, customer input may be received from a remote device via a suitable network connection. Suitable network connections may be facilitated by a network such as the Internet, a local area network (LAN), a wide area network (WAN), a LON WORKS network, and/or other types and kinds of networks or network connections as may be required and/or desired by a particular embodiment. Other methods, techniques, and/or devices for receiving user input may be utilized as desired in certain embodiments of the invention.

Additionally, the customer input may be received in response to one or more prompts or requests for information that are provided to the customer or a technician via one or more suitable output devices, such as output devices 160 shown in FIG. 1. For example, a display or interactive display may be utilized to request certain input associated with desired customer preferences for portion control dispenses.

The received customer input may be associated with customer preferences for portion control dispenses and/or with an operating environment associated with the beverage forming dispenser 100. Customer input may include, for example, input associated with one or more cup sizes that may be utilized in association with the beverage forming dispenser 100, input associated with an amount or ratio of ice that may be utilized in association with beverages dispensed by the beverage forming dispenser 100, input associated with a type of ice that may be utilized in association with beverages dispensed by the beverage forming dispenser, input associated with desired top-offs for portion control dispenses, and/or input associated with one or more corrections for beverage dispenses. Once the customer input is received in block 410, then processing may move to block 415.

In block 415, at least a portion of the received consumer input may be stored in at least one memory associated with the beverage forming dispenser 100, such as memory 180 and/or database 130 shown in FIG. 1. The processing may then move to block 420.

In block 420, portion control dispense parameters may be determined for one or more beverage selections associated with the beverage forming dispenser 100. The portion control dispense parameters for a beverage selection may be determined prior to a request to dispense the particular beverage or during the processing of a request to dispense the particular beverage.

For example, the stored customer preferences associated with portion control dispenses may be accessed once a request to dispense a particular beverage is received. At least a portion of the stored customer preferences may be utilized to determine one or more portion control dispense parameters for the selected beverage. In addition, other parameters associated with the selected beverage, such as the recipe for the selected beverage, may be utilized in determining the one or more portion control dispense parameters. For example, if the selected beverage is a CHERRY COCA-COLA™ beverage, stored information associated with the selected beverage may be accessed to determine characteristics associated with the selected beverage, its formulation, and/or its recipe. The stored information may, for example, identify the selected beverage as a high foam beverage or be utilized to determine that the selected beverage is a high foam beverage. In one embodiment, a stored table in an ingredient matrix may be utilized to specify foaming characteristics of various beverages. At least a portion of the customer preferences for portion control dispenses may also be accessed and utilized in determining portion control dispense parameters for the selected beverage. The accessing or selection of one or more of the customer preferences for portion control dispenses may be based at least in part on one or more of the other parameters associated with the selected beverage. As an example, the customer preferences that are accessed may include information associated with a cup size that has been selected for dispense of the selected beverage, a customer preference associated with an amount of ice to be placed in a cup, such as cup 145, a customer preference associated with an ice type, a customer preference associated with a number of desired top-offs for a high foam beverage, and a customer preference associated with a correction factor for a dispense or pour of the selected beverage. In this example, the customer preference associated with desired top-offs for a high foam beverage may be accessed in accordance with the selected beverage being identified or determined to be a high foam beverage. The accessed customer preferences for portion control dispenses and/or the other parameters associated with the selected beverage may be utilized to determine the portion control dispense parameters for the selected beverage.

In the example, a large CHERRY COCA-COLA™ beverage may be selected for dispense. The customer preference associated with a large cup size may specify that a large cup holds approximately twenty-two (22) ounces of beverage and/or ice. Additionally, the customer preferences associated with an amount of ice to be placed in the cup and an ice type may be utilized to determine an approximate amount of displacement for the ice in the cup. For purposes of this example, the ice displacement may be approximately six (6) ounces. Accordingly, it may be determined that approximately sixteen (16) ounces of beverage may be dispensed. Additionally, a correction factor for dispense may specify that the cup is only to be filled to 90% of the capacity of the cup. Accordingly, the amount of beverage to be dispensed in a portion control dispense may be adjusted to approximately 14.4 ounces. Once the amount to be dispensed is determined, the recipe for the selected beverage and the ratio of the ingredients for the selected beverage may be utilized to determine the portion control dispense parameters. Additionally, the top-off preferences may be utilized to determine the portion control dispense parameters. For example, if the desired number of top-offs is zero, then the portion control dispense parameters may be established in such a manner that the entire 14.4 ounces of the selected beverage will be dispensed in a single dispense. As another example, if the desired number of top-offs is two, then the portion control dispense parameters may be established in such a manner that the 14.4 ounces of the selected beverage will be dispensed in three dispenses. A first dispense may dispense a majority of the beverage and the two top-offs may be utilized to fill the cup as foam generated by the earlier dispenses subsides. A delay between a top-off dispense and previous dispense or top-off dispense may be determined based on the customer preferences or on default values that are pre-stored in association with the beverage forming dispenser 100.

In the current example, a beverage selection and a cup size selection may be received as inputs for a dispense selection and utilized in association with a portion control dispense; however, in certain embodiments of the invention, other inputs associated with a dispense selection may be received and utilized as desired. These other inputs may include a wide variety of other inputs associated with a dispense selection, for example, a selection of no ice or a selection of extra ice for a dispense. If other inputs are received for a dispense selection, then a portion control dispense or portion control dispense parameters for a dispense may be determined and/or adjusted based at least in part on the received other inputs. For example, if a no ice input is selected for a dispense, then the determination of portion control dispense parameters may take the no ice input into account and may ignore an ice displacement. Using the current example, if an approximately twenty-two (22) ounce cup is to be filled to approximately 90% of its capacity, then it may be determined that approximately 19.8 ounces of beverage may be dispensed if a no ice input is selected. As another example, if an extra ice input is selected in association with a dispense selection, then a portion control dispense may be determined and/or adjusted based at least in part on the extra ice input. One or more pre-stored preferences associated with extra ice, such as stored consumer preferences and/or default preferences, may be accessed and utilized in association with the determination of a portion control dispense with extra ice. For example, a stored preference associated with extra ice may specify that an additional approximately 50% of ice should be situated in or dispensed into a cup if extra ice is selected. Using the example of an approximately twenty-two (22) ounce cup with an ice displacement of approximately six (6) ounces, the stored preference for approximately 50% of extra ice may be taken into account in a determination of a portion control, and the ice displacement may be adjusted to approximately nine (9) ounces. Additionally, although 50% is utilized in the current example as an extra ice preference, it will be appreciated that a wide variety of extra ice preferences may be utilized as desired in various embodiments of the invention.

As another example of determining portion control dispense parameters, the customer preferences associated with portion control dispenses may be accessed prior to receiving a request to dispense a particular beverage. The customer preferences may be utilized in conjunction with other parameters associated with the selectable beverages, such as beverage formulations, characteristics, and/or recipes, to determine portion control dispense parameters for a particular beverage or for a plurality of beverages. The determination of portion control dispense parameters may be made in a similar manner to that described in the example above. Once the portion control dispense parameters have been determined, at least a portion of the portion control dispense parameters may be stored in one or more suitable memories associated with the beverage forming dispenser 100, such as memory 180 and/or database 110.

In one embodiment, portion control dispense parameters may be determined for a plurality of beverage selections associated with the beverage forming dispenser 100 based at least in part on the received customer input. In this regard, customer preferences associated with portion control dispenses may only be entered or input once and the beverage forming dispenser 100 may determine portion control dispense parameters for a wide variety of beverages based at least in part on the received customer preferences. Accordingly, there is no need to individually calibrate a portion control dispense for each cup size offered for each beverage selection. Once the portion control dispense parameters have been determined, then processing may move to block 425.

In block 425, a portion control dispense for a beverage selection may be configured based at least in part on the determined portion control dispense parameters. Similar to the determination of the portion control dispense parameters for a beverage, the portion control dispense for the beverage may be determined prior to or in response to the receipt of a request to dispense the beverage. In order to configure a portion control dispense for a beverage selection, the precise volumes or amounts of each of the ingredients for the beverage selection needed for the portion control dispense may be determined. Utilizing the above example for a large CHERRY COCA-COLA™ beverage, the portion control dispense parameters and the recipe for the selected beverage may be utilized to configure the portion control dispense. The portion control dispense parameters may establish that 14.4 ounces of beverage are to be dispensed with two top-offs. These parameters and the recipe for the selected beverage may be utilized to precisely determine the amounts or volumes of the various beverage forming ingredients that are needed to dispense the selected beverage. The determined amounts or volumes may be broken down into a plurality of dispenses in order to take the top-off preference into account. For example, the portion control dispense for the beverage may be configured to dispense precise amounts of the respective beverage forming ingredients to achieve a first pour of approximately ten (10) ounces of the beverage and two subsequent top-off pours of approximately 2.2 ounces each. A wide variety of relative amounts or volumes of the selected beverage that are dispensed for the main pour and any subsequent top-offs may be utilized as desired in accordance with certain embodiments of the invention. The amounts or volumes discussed above are provided as one example and are not limiting.

Additionally, in certain embodiments, default values for portion control dispenses may be pre-established for a beverage forming dispenser 100. These default values may then be edited by a consumer or technician.

The example method for establishing portion control dispenses may end following block 425.

In one embodiment of the invention, once a portion control dispense has been commenced for a selected beverage, the portion control dispense may be ceased or stopped if a suitable cancel command is received from a customer via one or more suitable input devices, such as input devices 165.

Figure 5:
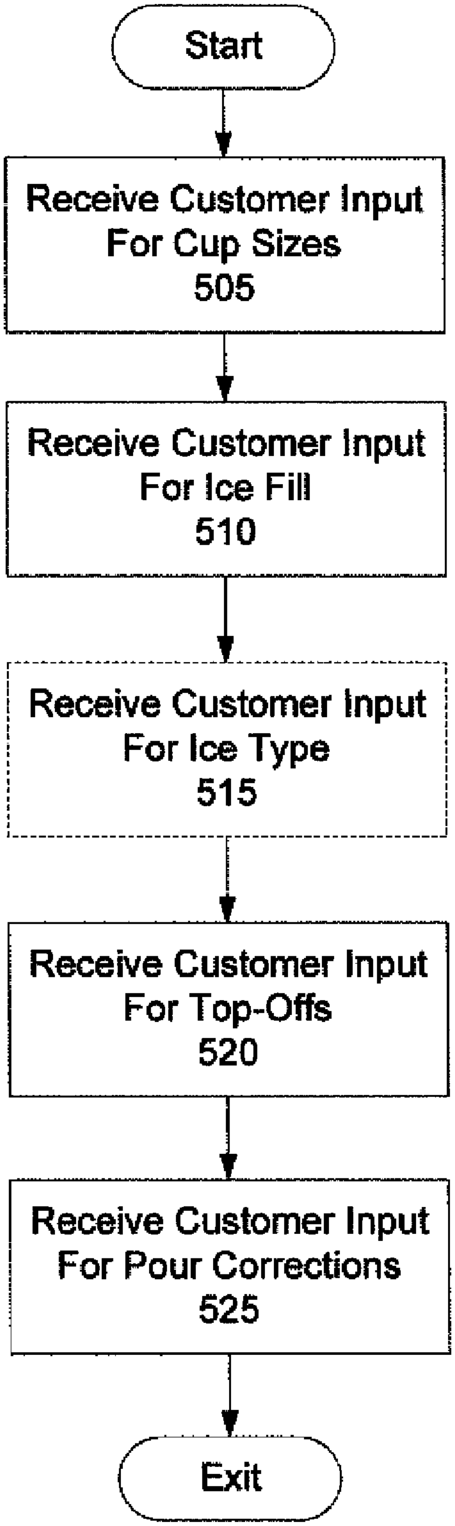
FIG. 5 illustrates one example of a method of receiving customer input for portion control dispenses for a beverage forming dispenser in accordance with an embodiment of the invention.

Referring to FIG. 5, there is illustrated one example of a method of receiving customer input for portion control dispenses for a beverage forming dispenser in accordance with an embodiment of the invention. The received customer input may be associated with customer preferences for portion control dispenses and/or with an operating environment associated with the beverage forming dispenser 100. The customer input for portion control dispenses may be received via one or more suitable input devices, such as input devices 165 shown in FIG. 1. For example, customer input for portion control dispenses may be received via a control panel, touchpad, or interactive display associated with the beverage forming dispenser. As another example, customer input may be received via the use of an appropriate data storage device, such as a removable data storage device that may be utilized to communicate the customer input to the beverage forming dispenser 100. As another example, customer input may be received from a remote device via a suitable network connection. Suitable network connections may be facilitated by a network such as the Internet, a local area network (LAN), a wide area network (WAN), a LON WORKS network, and/or other types and kinds of networks or network connections as may be required and/or desired by a particular embodiment. Other methods, techniques, and/or devices for receiving user input may be utilized as desired in certain embodiments of the invention.

Additionally, the customer input may be received in response to one or more prompts or requests for information that are provided to the customer or a technician via one or more suitable output devices, such as output devices 160 shown in FIG. 1. For example, a display or interactive display may be utilized to request certain input associated with desired customer preferences for portion control dispenses.

In block 505, customer input may be received for one or more cup sizes that may be associated with the dispense of beverages by the beverage forming dispenser 100. The received customer input associated with one or more cup sizes may define the cup sizes into which selected beverages may be dispensed. A wide variety of information associated with one or more cup sizes may be received including, for example, customer input for names to be associated with the one or more cup sizes and customer input associated with an amount or volume of beverage that may be held by each of the one or more cup sizes. For example, the customer may define or input names to be associated with one or more cup sizes. According to one embodiment, customer input may define names for one or more cup sizes that contain one or more characters. A customer may define cup size names as the customer sees fit. Example cup size names may include generic names such as small, medium, large, and X-large or other names such as child, big gulp, etc. It will also be appreciated that default cup size names may be established and stored in at least one memory associated with the beverage forming dispenser 100, such as memory 180 and/or database 130. These default cup size names may be changed or edited by a customer.

Additionally, in certain embodiments, a limit on the maximum number of characters may be associated with each of the names for the one or more cup sizes names. A wide variety of limits may be utilized in accordance with embodiments of the invention, and the limits may be defined at least in part by the display capabilities of output devices associated with the beverage forming dispenser 100 and/or with the capacity of memory or memory locations (e.g., a register) associated with the beverage forming dispenser. In one embodiment, a limit of eight characters may be set for each cup size name.

In addition to cup size names, consumer input may also be received for an amount or volume of beverage or other substances that may be held by each of the one or more cup sizes that are configured. In one embodiment, an amount or volume of beverage for each of the one or more cup sizes may be entered as ounces that may be held by the respective cup sizes; however, in certain embodiments of the invention, other units of volume may be utilized as desired, for example, metric units of volume. In an embodiment that utilizes one or more default cup size names, it will be understood that respective default cup size amounts may be associated with the default cup size names. These default cup size amounts may be changed or edited by a customer.

Customer input associated with cup sizes may be utilized to configure any number of cup sizes to be utilized in association with a beverage forming dispenser 100. In one embodiment, one (1) to ‘N’ cup sizes may be configured where ‘N’ represents the total number of cup sizes that are configured. Once cup size information is received in block 505, processing may move to block 510.

In block 510, which may be optional in certain embodiments of the invention, customer input associated with ice fill for beverage dispenses may be received. The customer input associated with ice fill may define an approximate amount of ice that may be placed, scooped, situated, or dispensed into a cup prior to the dispense of a beverage. Many different types of ice fill input may be utilized in accordance with embodiments of the invention. For example, the customer input associated with ice fill may define an approximate volume of ice for each of the cup size. As another example, the customer input associated with ice fill may define an approximate ratio of ice for a cup. In one embodiment, the customer input associated with ice fill may define an approximate ratio of ice. Advantageously, defining an approximate ratio of ice may define an approximate ratio of ice for all of the various cup sizes that are established. Many different ratios of ice fill may be established as desired in various embodiments of the invention including, but not limited to, no ice in a cup, approximately ¼ cup of ice, approximately ⅓ cup of ice, approximately ½ cup of ice, approximately ⅔ cup of ice, approximately ¾ cup of ice, and/or approximately a fill cup of ice. Once customer input for ice fill has been received, processing may move to block 515.

If an extra ice selection is associated with the beverage forming dispenser 100, then customer input associated with one or more extra ice parameters may also be received in block 510. Many different types of customer input associated with extra ice parameters may be received including, but not limited to, customer input associated with a percentage of extra ice that may be placed, scooped, situated, and/or dispensed into a cup and/or customer input associated with an amount or volume of extra ice that may be placed, scooped, situated, and/or dispensed into a cup. In one embodiment, the customer input associated with extra ice parameters may include an approximate percentage of extra ice that will be situated in a cup if an extra ice selection is selected for a dispense operation. A wide variety of percentages of extra ice may be input by a customer, for example, a percentage between approximately zero and approximately fifty percent (50%) extra ice.

In block 515, customer input associated with ice type for beverage dispenses may optionally be received. For example, it may not be necessary to receive input for ice type if a customer elects to have no ice in a cup. The customer input associated with ice type may allow a customer to select a type of ice from a predetermined list of ice types that best matches a type of ice that will be utilized in association with the dispense of beverages by the beverage forming dispenser 100. A customer may be permitted to select a type of ice from a predetermined list that includes a wide variety of ice types, including but not limited to, no ice, pellet ice, flaked ice, crushed ice, and/or cubed ice. The selected ice type may be utilized in a determination of the approximate displacement that may be caused by ice in a cup. Different ice types may lead to different displacements within the cup. For example, a cup that is half full of cubed ice may be capable of holding a larger amount or volume of a beverage than a cup that is half full of crushed ice. As an alternative to selecting an ice type, a customer may define an approximately displacement for each of the one or more cup sizes that is caused by ice in the cup. The received customer input for ice type may be utilized in a determination of portion control dispense parameters for one or more beverages. Once customer input for ice type has been received, processing may move to block 520.

In block 520, customer input associated with top-offs may be received. The customer input associated with top-offs may establish or define a number of top-offs for a dispense of a beverage. The number of top-offs may be established for all dispensed beverages, for groups of related beverages or beverage types, or for individual beverages as desired. In one embodiment, the number of top-offs may be established for various groups of beverages that have similar characteristics, such as, similar foaming characteristics. Certain types of beverages, such as carbonated beverages, may foam more than other types of beverages during dispense. Due to different foaming characteristics, it may be desirable to establish a different number of top-offs for different groups or types of beverages. A wide variety of different beverage groups or beverage types may be utilized in accordance with embodiments of the invention. In one embodiment, a respective number of top-offs may be established for beverages with high foam characteristics, for beverages with medium foam characteristics, and for beverages with low foam characteristics. Any number of top-offs may be established as desired for each of the groups of beverages, for example, zero, one, or two top-offs. Additionally, in certain embodiments, default values may be pre-stored for the number of top-offs for various groups of beverages and then edited or approved by subsequently received customer input.

The received customer input associated with top-offs may further include a delay associated with the top-offs. The delay may define or establish a time interval that is to occur prior to the dispense of a top-off following the main pour of a beverage or another top-off dispense for a beverage. The delay may be established for all dispensed beverages, for groups of related beverages or beverage types, or for individual beverages as desired. Additionally, in certain embodiments, different delays may be established if multiple top-offs are conducted. For example, a first delay may be established between a main pour and a first top-off, and a second delay may be established between the first top-off and a second top-off. In one embodiment, the delay may be established for various groups of beverages that have similar characteristics, such as, similar foaming characteristics. Utilizing the example above, a respective delay may be established for beverages with high foam characteristics, for beverages with medium foam characteristics, and for beverages with low foam characteristics. The customer input associated with a delay may be any suitable timing input, for example, a timing input that establishes a number of seconds to delay prior to a top-off. Additionally, in certain embodiments, default values may be pre-stored for the top-off delay for various groups of beverages and then edited or approved by subsequently received customer input.

The top-offs discussed herein are top-offs for portion control dispenses. In addition to or as an alternative to these automatic top-offs, a beverage forming dispenser 100 may include a manual top-off function or selection that permits a customer to manually dispense a selected beverage following a portion control dispense. In one embodiment of the invention, once a portion control dispense has been completed for a selected beverage, a manual top-off may be performed if a suitable pour or top-off command is received from a customer via one or more suitable input devices, such as input devices 165. Once customer input for top-offs has been received processing may move to block 520.

In block 525, customer input for pour corrections may be received. The customer input for pour corrections may establish or define a correction to the amount or volume of a beverage that is dispensed by the beverage forming dispenser 100. A pour correction may be utilized to account for a wide variety of different factors and/or operating environment conditions associated with the beverage forming dispenser 100 including, but not limited to, seasonal water changes, ice types, syrup temperatures, and/or other miscellaneous factors that may influence or affect the amount of a dispensed beverage or the foaming characteristics of a dispensed beverage. In one embodiment, the pour correction may be established as a percentage value and, therefore, may be utilized for all available cup sizes. A pour correction may be established for all dispensed beverages, for groups of related beverages or beverage types, or for individual beverages as desired. In one embodiment, a universal pour correction for all dispensed beverages may be established as a percentage value. A wide range of percentage values may be utilized in accordance with the example embodiment, for example, a percentage value that is in the range of approximately minus twenty percent (−20%) and approximately plus twenty percent (20%). The established pour correction may be utilized in the determination of one or more portion control dispense parameters for one or more beverage selections as discussed above with reference to FIG. 4.

The example method for receiving customer input for portion control dispenses may end following block 525.

Figure 6:
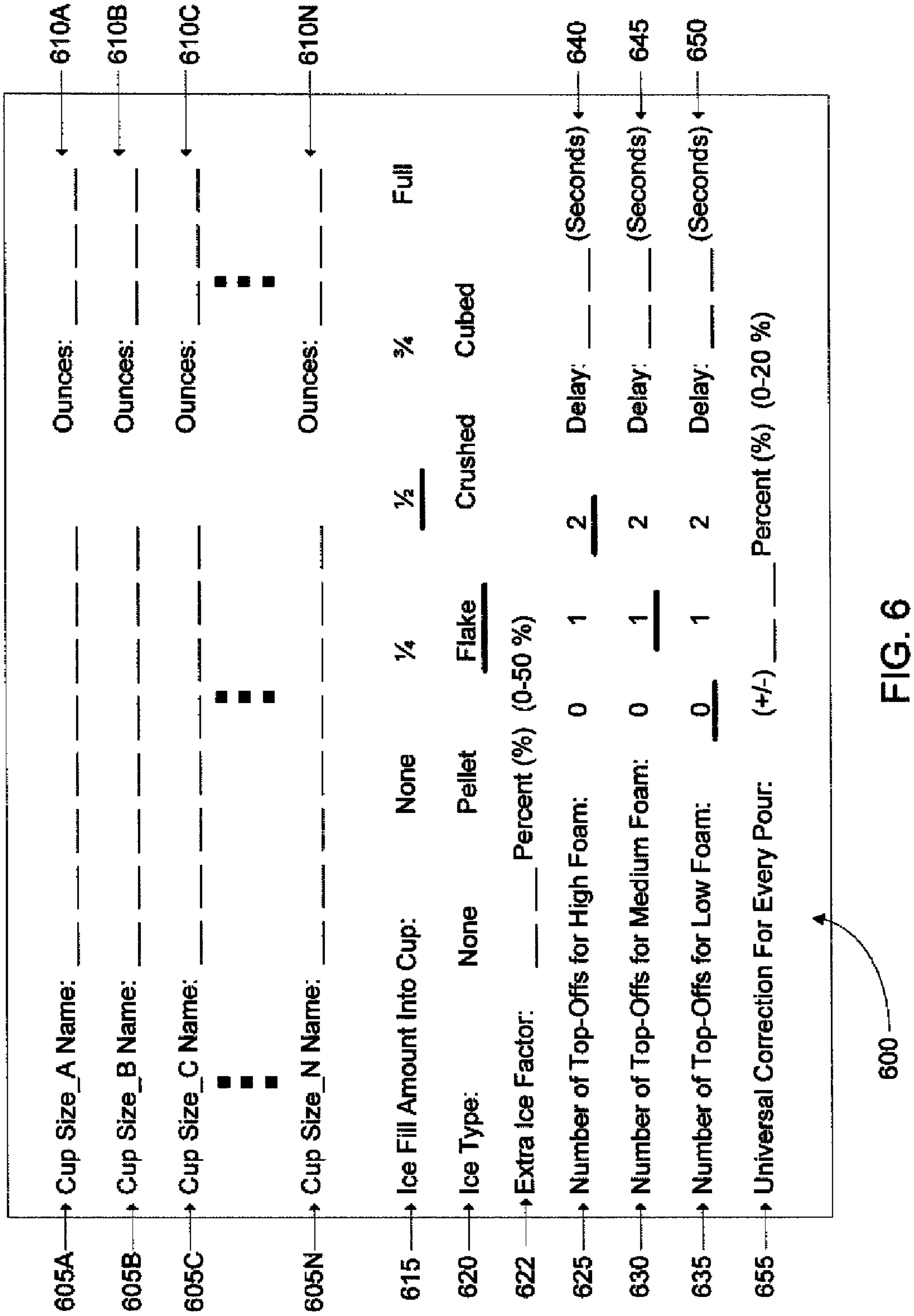
FIG. 6 illustrates one example of customer input options for portion control dispenses for a beverage forming dispenser in accordance with an embodiment of the invention.

Referring to FIG. 6, there is illustrated one example of customer input options for portion control dispenses for a beverage forming dispenser in accordance with an embodiment of the invention. FIG. 6 illustrates one graphical user interface 600 that may be provided to a customer or technician to facilitate the input of customer options for portion control dispenses. In one embodiment of the invention, a customer or technician may input customer options in accordance with the graphical user interface 600. In a plurality of example embodiments of the invention, customer options may be input via multiple graphical user interfaces, via pull down menus, as a result of customer prompts, and/or via other suitable techniques, methods, or devices as may be desired.

Referring to FIG. 6, customer preferences associated with portion control dispenses may be input. Customer preferences associated with the names of one to 'N' cup sizes may be input in respective cup size name locations 605A-605N where 'N' is the total number of cup sizes utilized in conjunction with the beverage forming dispenser 100. Similarly, customer preferences associated with a volume or amount that may be held be each of the respective cup sizes may be input in respective cup volume locations 610A-610N. A customer preference for an ice fill amount may be selected from a list of ice fill amount options 615, and a customer preference for an ice type may be selected from a list of ice types 620. A customer preference for an extra ice percentage may be established as a percentage at an extra ice factor location 622.

A respective number of top-offs may be selected or input for high foam beverages, medium foam beverages, and low foam beverages utilizing respective number of top-off selection lists 626, 630, 635. Additionally, respective top-off delays may be established for high foam beverages, medium foam beverages, and low foam beverages at respective delay time locations 640, 645, 650. A universal correction factor for every pour may also be established as a percentage at a universal pour factor location 655.

Figure 7:
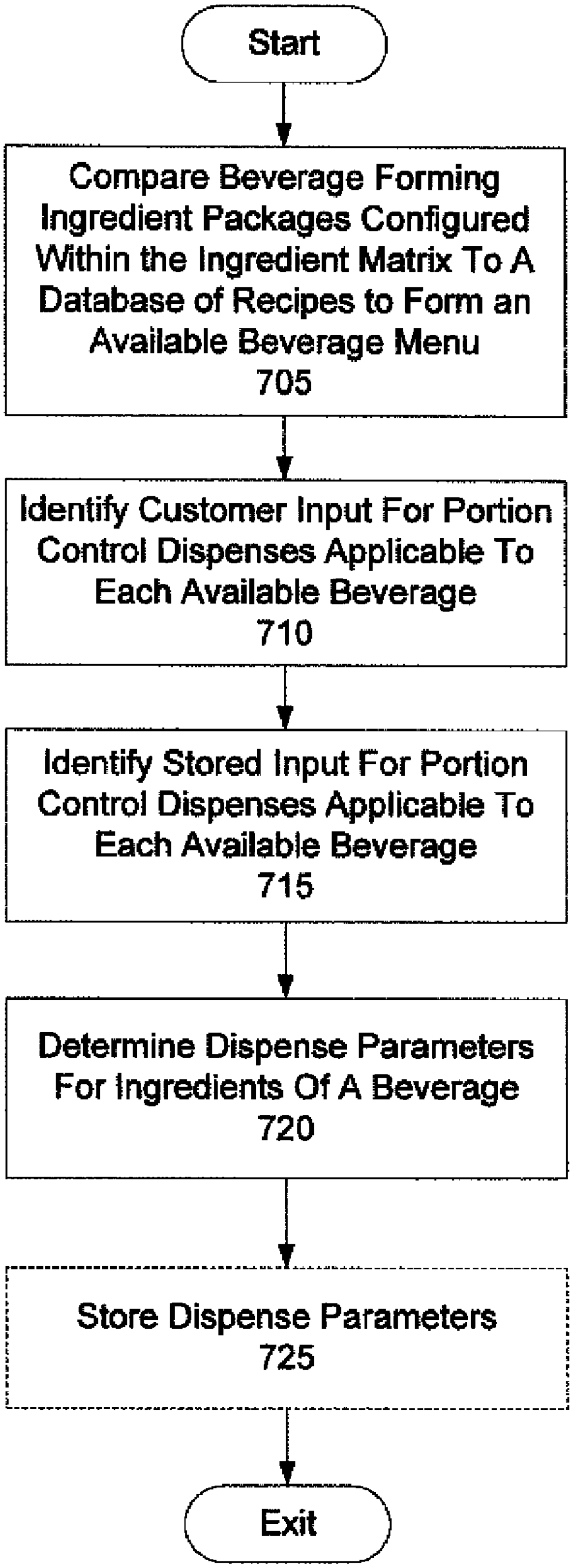
FIG. 7 illustrates one example of a method of determining portion control dispense parameters for a beverage forming dispenser in accordance with an embodiment of the invention.

Referring to FIG. 7, there is illustrated one example of a method of determining portion control dispense parameters for a beverage forming dispenser in accordance with an embodiment of the invention. Portion control dispense parameters may be determined for one or more beverages that may be dispensed by a beverage forming dispenser, such as dispenser 100, based at least in part on received customer input associated with portion control dispenses and/or information associated with characteristics of a beverage.

In block 705, an available beverage menu may be determined at least in part by comparing the beverage forming ingredient packages, illustrated as 114 in FIG. 1, and other beverage forming ingredients that have been inserted into or connected to an ingredient matrix, such as 112, to a database of beverage recipes, such as 130. The various beverage recipes stored in the database 130 may define the beverage forming ingredients that are needed for a particular beverage. The needed ingredients may be compared to the beverage forming ingredients that are inserted into or connected to the ingredient matrix 112 in order to identify the available beverages that may be formed and dispensed by the beverage forming dispenser. Once an available beverage menu has been determined, processing may move to block 710.

In block 710, customer input for portion control dispenses that is applicable to an available beverage may be identified and/or accessed. As discussed above with reference to FIGS. 4-6, the customer input may establish or define customer preferences for a portion control dispense of an available beverage including, but not limited to, a plurality of cup sizes and cup size names, an ice fill amount, an ice type, a number of top-offs, and a pour correction. Once the customer inputs have been identified, processing may move to block 715.

In block 715, one or more stored parameters or characteristics may be identified that are applicable to an available beverage. These identified parameters may include, for example, characteristics of an available beverage and/or a recipe for an available beverage that defines the beverage forming ingredients that are needed to form the available beverage. These identified parameters may be utilized to establish portion control dispense parameters for the available beverage. Once the one or more stored input parameters or characteristics applicable to the available beverage have been identified, processing may move to block 720.

In block 720, one or more portion control dispense parameters may be determined for the available beverage based at least in part on the identified customer inputs and/or the identified stored parameters or characteristics applicable to the available beverage. An example of the determination of one or more portion control dispense parameters is described above with reference to FIG. 4. Once the dispense parameters have been determined for an available beverage In block 725, the determined portion control dispense parameters for an available beverage may optionally be stored in a suitable memory device, such as memory 180 and/or database 130 shown in FIG. 1.

The example method for receiving customer input for portion control dispenses may end following block 725. In accordance with one embodiment, the method described in FIG. 7 may be repeated for a plurality of available beverages in order to determine respective portion control dispense parameters for each of the plurality of available beverages. The formation of an available beverage menu does not necessarily have to be repeated for the determination of portion control dispense parameters for other available beverages. Additionally, the determination of portion control dispense parameters may be carried out prior to the receipt of a request to dispense a selected beverage and/or as part of the processing of received request to dispense a selected beverage.

Additionally, new beverage forming ingredient packages 114 may be inserted into the ingredient matrix 112. With the addition of new beverage forming ingredient packages, the beverage forming dispenser 100 may be capable of dispenses additional types of beverages, as defined by a recipe database, such as 130. The recipe database 130 may be manually and/or automatically updated periodically in order to maintain an accurate list of beverage recipes. As new beverage selections become available for dispense by the beverage forming dispenser 100, the beverage forming dispenser may utilize the customer preferences for portion control dispense, the recipes and/or other characteristics associated with the new available beverages to determine portion control dispense parameters associated with the new available beverages.

Figure 8:
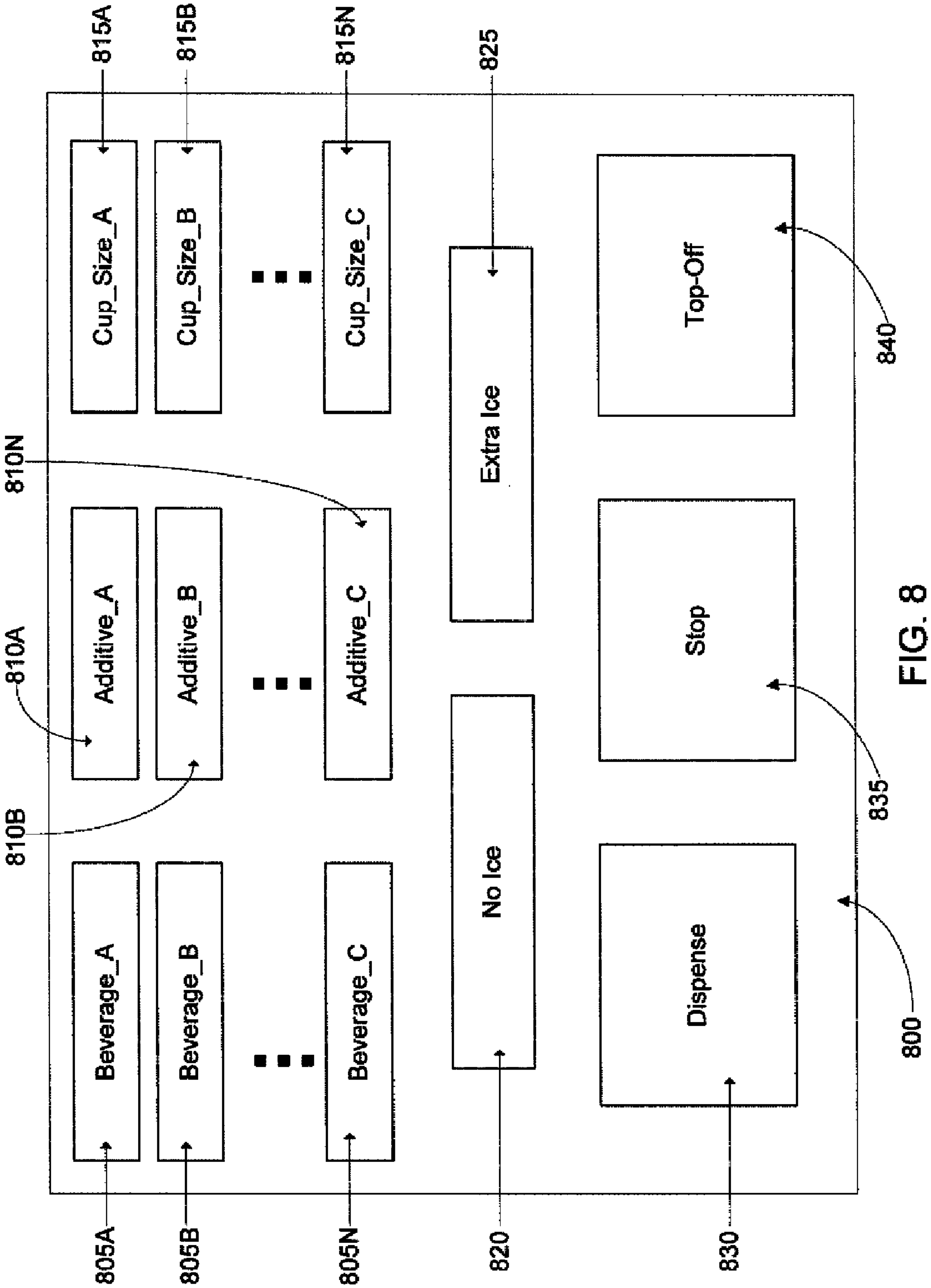
FIG. 8 illustrates one example of customer input options for the selection of a beverage for a portion control dispense by a beverage forming dispenser in accordance with an embodiment of the invention.

Referring to FIG. 8, there is illustrated one example of customer input options for the selection of a beverage for a portion control dispense by a beverage forming dispenser in accordance with an embodiment of the invention. FIG. 8 illustrates one graphical user interface 800 that may be provided to a customer to facilitate the input of customer options for a beverage to be dispensed. In one embodiment of the invention, a customer may input customer selections of beverages for dispense in accordance with the graphical user interface 800. In a plurality of example embodiments of the invention, customer selections may be input via multiple graphical user interfaces, via pull down menus, as a result of customer prompts, and/or via other suitable techniques, methods, or devices as may be desired.

With reference to FIG. 8, a customer input for the selection of a beverage may be received. In certain embodiments of the invention, the customer may select a beverage by selecting a beverage indicator, such as indicator 805A, from a plurality of available beverage indicators 805A-N. For example, a customer may select a branded COCA-COLA™ indicator to select as a beverage to be dispensed. Example embodiments of the invention may include any number of selectable beverage indicators 805A-N. These indicators may be displayed on a single graphical user interface, on a scrollable graphical user interface, or on multiple graphical user interfaces as desired in various embodiments of the invention.

A customer may also select one or more beverage additives to be dispensed with the beverage by selecting one or more associated beverage additive indicators 810A-N. For example, a customer may select a beverage additive indicator associated with cherry syrup in order to dispense the cherry syrup with the COCA-COLA™ beverage. Example embodiments of the invention may include any number of selectable beverage additive indicators 810A-N. These indicators may be displayed on a single graphical user interface, on a scrollable graphical user interface, or on multiple graphical user interfaces as desired in various embodiments of the invention.

A customer may also select a cup size for a beverage dispense by selecting a cup size indicator, such as indicator 815A, from a plurality of available cup size indicators 815A-N. For example, a customer may select a large cup size for a dispense of a beverage. Example embodiments of the invention may include any number of selectable cup size indicators 815A-N. These indicators may be displayed on a single graphical user interface, on a scrollable graphical user interface, or on multiple graphical user interfaces as desired in various embodiments of the invention.

In order to dispense a beverage, selection of at least a beverage and a cup size may be received. Additionally, other customer selections may be received, for example, one or more beverage additive and/or one or more ice selections. As examples of ice selections that may be received, a customer may select a "no ice" indicator 820 or an "extra ice" indicator in order to modify the dispense of the beverage to include either no ice or extra ice. Other ice selections may be received as desired in other embodiments of the invention. In some embodiments, a default beverage and/or a default cup size may be determined if customer selection of either a beverage or a cup size is not received. In other embodiments, the parameters for a last dispense beverage may be determined and utilized if new customer selections for a beverage dispense are not received.

Once customer selections for a beverage to be dispensed are received, the customer may select a "dispense" indicator 830 to initiate a portion control dispense of the selected beverage. Once the "dispense" indicator 830 is selected, the beverage forming dispenser may configure a portion control dispense of the selected beverage and dispense the selected beverage. If the customer selects a "stop" indicator 835 during the dispense, then the dispense may be ceased. Additionally, once a dispense is complete, if the customer selects a "top-off" indicator 840, then the beverage forming dispenser may perform a top-off of the last beverage dispensed. The top-off may be a dispense of a predetermined amount of beverage in certain embodiments of the invention, for example, one-half of an ounce or one ounce of beverage. Alternatively, the top-off may be a manual top-off that is performed for the length of time that the "top-off" indicator 840 is selected by the customer. As another alternative, selection of the "top-off" indicator 840 may begin a top-off that continues until another selection is received, for example, another selection of the "top-off" indicator 840 or a selection of the "stop" indicator 835.

Although a "top-off" indicator 840 is illustrated in FIG. 8, in certain embodiments of the invention, a top-off may be performed if the "dispense" indicator 830 is selected by the customer during a predetermined period of time, for example, within 10 seconds, following a portion control dispense of a beverage. Other methods and techniques for selecting and facilitating top-offs and/or portion control dispenses may be utilized as desired in other embodiments of the invention.

Figure 9:
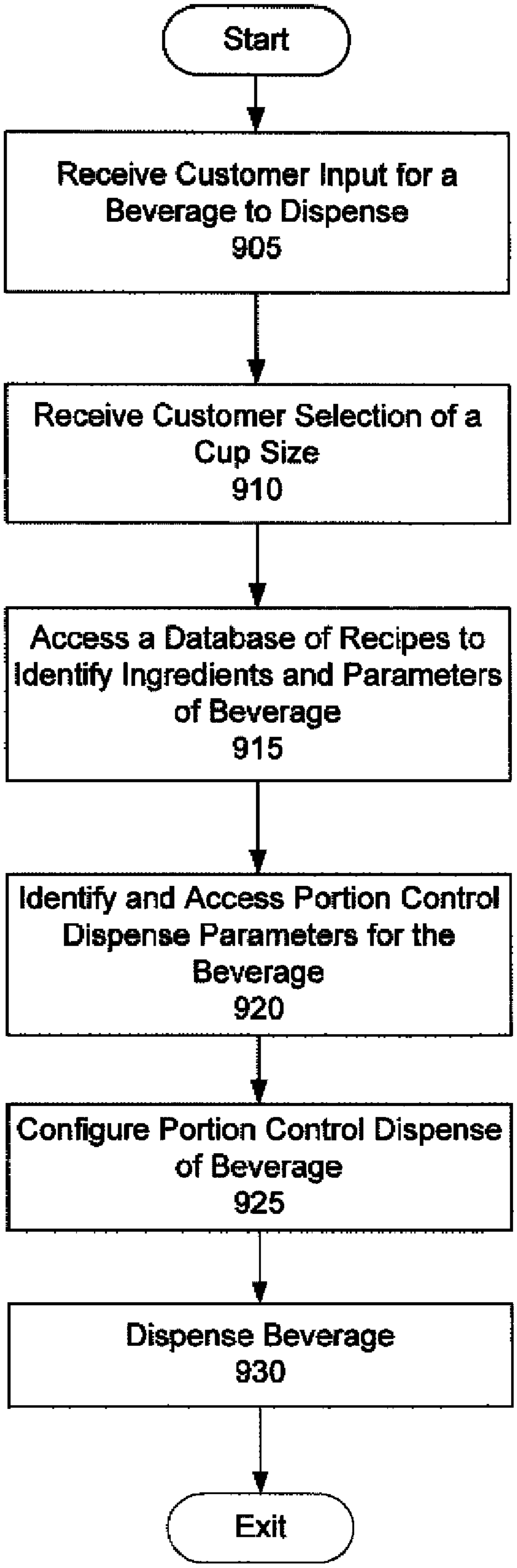
FIG. 9 illustrates one example of a method of receiving a selection of a beverage and dispensing a portion control amount of the selected beverage by a beverage forming dispenser in accordance with an embodiment of the invention.

Referring to FIG. 9, there is illustrated one example of a method of receiving a selection of a beverage and dispensing a portion control amount of the selected beverage by a beverage forming dispenser in accordance with an embodiment of the invention. Customer input for the selection of a beverage to be dispensed may be received and a portion control dispense for the selected beverage may be configured and performed by a beverage forming dispenser.

The example method may begin at block 905. At block 905, customer input for a beverage to dispense may be received. The customer input may specify, for example, a selected beverage and/or one or more beverage additives to be dispensed with the beverage. At block 910, a customer selection of a cup size may be received. In addition to a beverage and/or a cup size, other customer input may be received as desired in various embodiments of the invention, for example, ice selections, top-off selections, etc.

Once customer input for a beverage to dispense and a cup size for the beverage has been received, operations may continue at block 915. At block 915, a database of recipes may be accessed in order to identify ingredients of the selected beverage and/or parameters or characteristics of the selected beverage, for example, foaming characteristics of the selected beverage. At block 920, portion control dispense parameters for the selected beverage, for example, customer preferences for a portion control dispense of the selected beverage, may be identified and accessed. For example, stored customer preferences for a portion control dispense of a beverage may be identified based at least in part on characteristics of the selected beverage, such as, foaming characteristics of the beverage. The stored customer preferences may then be accessed for configuring a portion control dispense of the selected beverage.

At block 925, a portion control dispense of the selected beverage may be configured. The configuration of the portion control dispense may be based at least in part on the ingredients and parameters of the beverage. For example, a determination may be made as to the amount of each ingredient to dispense during a portion control dispense of the selected beverage. Additionally, the configuration of the portion control dispense may be based at least in part on the portion control dispense parameters for the beverage. For example, portion control dispense parameters associated with a type of ice and/or a number of top-offs may be taken into consideration when configuring a portion control dispense of a beverage. More specific examples of the configuration of a portion control dispense for a beverage are provided above with reference to FIGS. 4 and 7.

Once a portion control dispense for the selected beverage has been configured at block 925, operations may continue at block 930 and a portion control dispense of the selected beverage may be performed. In other words, the selected beverage may be dispensed in accordance with the various parameters for the portion control dispense of the selected beverage.

The example method of receiving a selection of a beverage and dispensing a portion control amount of the selected beverage may end following block 930.

Additionally, at least one program storage device readable by a machine, tangibly embodying at least one program or set of instructions executable by the machine to perform the capabilities of the embodiments of the invention can be provided.

The flow diagrams depicted herein are examples. There may be many variations to these diagrams or the steps (or operations) described therein without departing from the scope of the invention. For instance, the steps may be performed in a differing order, or steps may be added, deleted or modified. All of these variations are considered a part of the claimed invention.

While embodiments of the invention have been described, it will be understood that those skilled in the art, both now and in the future, may make various improvements and enhancements which fall within the scope of the claims which follow. These claims should be construed to maintain the proper protection for the invention first described.

The claimed invention is:

1. A method for configuring portion control dispenses for a dispenser apparatus, the method comprising:

associating a plurality of beverage forming ingredients with the dispenser apparatus, wherein a plurality of selectable beverages may be formed from the plurality of beverage forming ingredients;

receiving, by the dispenser apparatus, input comprising one or more preferences associated with portion control dispenses, the one or more preferences comprising preferences associated with automatic top-offs to be performed for beverages having particular foaming characteristics;

accessing, by the dispenser apparatus, stored information associated with one or more of the selectable beverages, the stored information comprising at least one foaming characteristic for the one or more selectable beverages; and determining, by the dispenser apparatus based at least in part upon the received input and the accessed information, at least one portion control dispense parameter for the dispense of predetermined amounts of the one or more selectable beverages.

2. The method of claim 1, wherein receiving input comprising one or more preferences associated with automatic top-offs comprises receiving input comprising at least one of (i) a number of top-offs to be performed or (ii) a time delay associated with automatic top-offs.

3. The method of claim 1, wherein determining at least one portion control dispense parameter comprises:

identifying a foaming characteristic for a beverage;

determining, based upon the identified foaming characteristic and the received input, a number of automatic top-offs to be performed for the beverage; and calculating, based at least in part upon the determined number of automatic top-offs, one or more predetermined amounts of the beverage to be dispensed.

4. The method of claim 1, wherein receiving input further comprises receiving input comprising one or more preferences associated with ice to be situated in a cup prior to dispensing one or more of the plurality of selectable beverages, and further comprising:

determining, by the dispenser apparatus based at least in part on the one or more preferences associated with ice, an approximate displacement of the ice; and determining, by the dispenser apparatus, the at least one portion control dispense parameter based at least in part on the determined approximate displacement.

5. The method of claim 4, wherein the one or more preferences associated with ice comprise at least one of an amount of ice that is situated in the cup, a type of ice that is situated in the cup, or a correction factor for dispense.

6. The method of claim 4, wherein the one or more preferences associated with ice comprise a ratio of ice to a size of the cup.

7. The method of claim 1, wherein receiving input further comprises receiving input comprising one or more preferences associated with a plurality of cup sizes, and wherein determining at least one portion control dispense parameter comprises determining at least one respective portion control dispense parameter for each of the plurality of cup sizes.

8. The method of claim 1, wherein accessing stored information further comprises accessing stored information associated with respective ingredients for the one or more selectable beverages.

9. The method of claim 1, further comprising:

identifying, by the dispenser apparatus based at least in part on the accessed information, one or more preferences associated with the received input that are relevant to the one or more selectable beverages.

10. The method of claim 1, wherein determining at least one portion control dispense parameter comprises determining at least one respective portion control dispense parameter for each of a plurality of the selectable beverages.

11. A method for dispensing a portion control amount of a selected beverage, the method comprising:

associating a plurality of beverage forming ingredients with a dispenser apparatus, wherein a plurality of selectable beverages may be formed from the plurality of beverage forming ingredients;

receiving, by the dispenser apparatus, input comprising one or more preferences associated with portion control dispenses, the one or more preferences comprising preferences associated with automatic top-offs to be performed for beverages having particular foaming characteristics;

receiving, by the dispenser apparatus, a command to dispense a selected beverage;

accessing, by the dispenser apparatus, stored information associated with the selected beverage, the stored information comprising at least one foaming characteristic for the selected beverage; and calculating, by the dispenser apparatus based at least in part upon the received input and the accessed information, one or more predetermined amounts of the selected beverage to be dispensed in a portion control dispense; and dispensing, by the dispenser apparatus, the calculated one or more predetermined amounts.

12. The method of claim 11, wherein receiving input comprising one or more preferences associated with automatic top-offs comprises receiving input comprising at least one of (i) a number of top-offs to be performed or (ii) a time delay associated with automatic top-offs.

13. The method of claim 11, wherein calculating one or more predetermined amounts comprises:

identifying a foaming characteristic for the selected beverage;

determining, based upon the identified foaming characteristic and the received input, a number of automatic top-offs to be performed for the selected beverage; and calculating, based at least in part upon the determined number of automatic top-offs, the one or more predetermined amounts of the beverage to be dispensed.

14. The method of claim 11, wherein receiving input further comprises receiving input comprising one or more preferences associated with ice to be situated in a cup prior to dispensing one or more of the plurality of selectable beverages, and further comprising:

determining, by the dispenser apparatus based at least in part on the one or more preferences associated with ice, an approximate displacement of the ice; and calculating, by the dispenser apparatus based at least in part on the determined approximate displacement, the one or more predetermined amounts of the selected beverage to be dispensed.

15. The method of claim 14, wherein the one or more preferences associated with ice comprise at least one of an amount of ice that is situated in the cup, a type of ice that is situated in the cup, or a correction factor for dispense.

16. The method of claim 14, wherein the one or more preferences associated with ice comprise a ratio of ice to a size of the cup.

17. The method of claim 11, wherein accessing stored information further comprises accessing stored information associated with a recipe for the selected beverage, and further comprising:

determining, by the dispenser apparatus, a respective amount of each of the ingredients of the selected beverage to dispense based at least in part on the accessed recipe for the selected product.

18. A dispenser apparatus, comprising:

an ingredient matrix operable to receive a plurality of beverage product ingredient packages within respective locations, wherein a plurality of selectable beverages may be formed from the plurality of beverage product ingredients;

a memory device operable to store information associated with one or more of the plurality of selectable beverages;

an input device operable to receive one or more preferences associated with portion controls, the one or more preferences comprising preferences associated with automatic top-offs to be performed for beverages having particular foaming characteristics; and a controller operable to execute a set of instructions operable to:

receive the one or more preferences from the input device;

access at least a portion of the stored information, the accessing information comprising at least one foaming characteristic for the one or more selectable beverages; and determine, by the dispenser apparatus based at least in part upon the received input and the accessed information, at least one portion control dispense parameter for the dispense of predetermined amounts of the one or more selectable beverages.

19. The dispenser apparatus of claim 18, wherein the one or more preferences associated with automatic top-offs comprise at least one of (i) a number of top-offs to be performed or (ii) a time delay associated with automatic top-offs.

20. The dispenser apparatus of claim 18, wherein the controller is configured to determine the at least one portion control dispense parameter by:

identifying a foaming characteristic for a beverage;

determining, based upon the identified foaming characteristic and the received input, a number of automatic top-offs to be performed for the beverage; and calculating, based at least in part upon the determined number of automatic top-offs, one or more predetermined amounts of the beverage to be dispensed.

21. The dispenser apparatus of claim 18, wherein the input device is further configured to receive one or more preferences associated with ice to be situated in a cup prior to dispensing one or more of the plurality of selectable beverages, and wherein the controller is further operable to execute the set of instructions to:

determine, based at least in part on the one or more preferences associated with ice, an approximate displacement of the ice; and determine the at least one portion control dispense parameter based at least in part on the determined approximate displacement.

22. The dispenser apparatus of claim 21, wherein the one or more preferences associated with ice comprise at least one of an amount of ice that is situated in the cup, a type of ice that is situated in the cup, or a correction factor for dispense.

23. The dispenser apparatus of claim 18, wherein the input device is further configured to receive one or more preferences associated with a plurality of cup sizes, and wherein the determined at least one portion control dispense parameter comprises at least one respective portion control dispense parameter for each of the plurality of cup sizes.

24. The dispenser apparatus of claim 18, wherein the accessed information further comprises information associated with respective ingredients for the one or more selectable beverages.

25. The dispenser apparatus of claim 21, wherein the determined at least one portion control dispense parameter comprises at least one respective portion control dispense parameter for each of a plurality of the selectable beverages.

* * * * *